US008142273B2

(12) United States Patent
Williams et al.

(10) Patent No.: US 8,142,273 B2
(45) Date of Patent: Mar. 27, 2012

(54) PRESENTATION OF WHEELS ON GAMING MACHINES HAVING MULTI-LAYER DISPLAYS

(75) Inventors: David C. Williams, Carson City, NV (US); Joseph Randy Hedrick, Reno, NV (US); Kurt M. Larsen, Reno, NV (US)

(73) Assignee: IGT, Reno, NV (US)

(*) Notice: Subject to any disclaimer, the term of this patent is extended or adjusted under 35 U.S.C. 154(b) by 55 days.

(21) Appl. No.: 11/938,151

(22) Filed: Nov. 9, 2007

(65) Prior Publication Data

US 2008/0113756 A1 May 15, 2008

Related U.S. Application Data

(60) Provisional application No. 60/858,741, filed on Nov. 13, 2006.

(51) Int. Cl.
*A63F 13/00* (2006.01)

(52) U.S. Cl. ........................................................ 463/20

(58) Field of Classification Search ..................... 463/20
See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,607,844 | A | 8/1986 | Fullerton |
| 4,621,814 | A | 11/1986 | Stephen et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,152,529 | A | 10/1992 | Okada |

(Continued)

FOREIGN PATENT DOCUMENTS

AU 721968 7/2000

(Continued)

OTHER PUBLICATIONS

Stic Search History.*

(Continued)

*Primary Examiner* — Dmitry Suhol
*Assistant Examiner* — Malina K Rustemeyer
(74) *Attorney, Agent, or Firm* — Weaver Austin Villeneuve & Sampson LLP

(57) ABSTRACT

Gaming machines, systems and methods for presenting gaming wheels are disclosed. Gaming machines can include an exterior housing, master gaming controller, display device, specialized wheel processor, speakers and a network interface. A multi-layer display device adapted to display a gaming wheel having a plurality of wheel stops distributed thereupon can include a display controller that generates or transmits display signals, a first display screen that presents a first visual display and a second display screen that presents a second visual display, where the second display screen is positioned behind the first display screen such that the first and second visual displays combine for a single visual presentation that can include a gaming wheel. Different portions of the gaming wheel can be presented on both of the first and second display screens. Multiple spinning wheels can overlap and/or align concentrically for alternative wager-based games.

24 Claims, 8 Drawing Sheets

U.S. PATENT DOCUMENTS 5,319,491 A 6/1994 Selbrede
5,342,047 A 8/1994 Heidel et al.
5,364,100 A 11/1994 Ludlow et al.
5,375,830 A 12/1994 Takemoto et al.
5,376,587 A 12/1994 Buchmann et al.
5,393,057 A 2/1995 Marnell
5,393,061 A 2/1995 Manship et al.
5,395,111 A 3/1995 Inoue
5,467,893 A 11/1995 Landis, II et al.
5,539,547 A 7/1996 Ishii et al.
5,580,055 A 12/1996 Hagiwara
5,585,821 A 12/1996 Ishikura et al.
5,589,980 A 12/1996 Bass et al.
5,647,798 A 7/1997 Faiciglia
5,725,428 A 3/1998 Achmueller
5,745,197 A 4/1998 Leung et al.
5,752,881 A 5/1998 Inoue
5,762,552 A * 6/1998 Vuong et al. .................... 463/25
5,764,317 A 6/1998 Sadovnik et al.
5,785,315 A 7/1998 Eiteneer et al.
5,788,573 A 8/1998 Baerlocher et al.
5,833,537 A 11/1998 Barrie
5,851,148 A 12/1998 Brune et al.
5,910,046 A 6/1999 Wada et al.
5,923,307 A 7/1999 Hogle, IV
5,951,397 A 9/1999 Dickinson
5,956,180 A 9/1999 Bass et al.
5,967,893 A 10/1999 Lawrence et al.
5,988,638 A 11/1999 Rodesch et al.
5,993,027 A 11/1999 Yamamoto et al.
6,001,016 A 12/1999 Walker et al.
6,015,346 A 1/2000 Bennett
6,027,115 A 2/2000 Griswold et al.
6,050,895 A 4/2000 Luciano et al.
6,054,969 A 4/2000 Haisma
6,057,814 A 5/2000 Kalt
6,059,289 A 5/2000 Vancura
6,059,658 A 5/2000 Mangano et al.
6,068,552 A 5/2000 Walker
6,086,066 A 7/2000 Takeuchi
6,093,102 A 7/2000 Bennett
6,135,884 A 10/2000 Hedrick et al.
6,159,095 A 12/2000 Frohm et al.
6,159,098 A 12/2000 Slomiany et al.
6,168,520 B1 1/2001 Baerlocher et al.
6,190,255 B1 2/2001 Thomas et al.
6,213,875 B1 4/2001 Suzuki
6,227,971 B1 5/2001 Weiss
6,234,897 B1 5/2001 Frohm et al.
6,244,596 B1 6/2001 Kondratjuk
6,251,013 B1 6/2001 Bennett
6,251,014 B1 6/2001 Stockdale et al.
6,252,707 B1 6/2001 Kleinberger et al.
6,254,481 B1 7/2001 Jaffe
6,261,178 B1 7/2001 Bennett
6,270,411 B1 8/2001 Gura et al.
6,297,785 B1 10/2001 Heintz et al.
6,315,666 B1 11/2001 Mastera et al.
6,322,445 B1 11/2001 Miller
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,398,220 B1 6/2002 Inoue
6,416,827 B1 7/2002 Chakrapani et al.
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,511,375 B1 1/2003 Kaminkow
6,512,559 B1 1/2003 Hashimoto et al.
6,514,141 B1 2/2003 Kaminkow et al.
6,517,433 B2 2/2003 Loose et al.
6,517,437 B1 2/2003 Wells et al.
6,520,856 B1 2/2003 Walker et al.
6,532,146 B1 3/2003 Duquette
6,547,664 B2 4/2003 Saunders
6,575,541 B1 6/2003 Hedrick et al.
6,585,591 B1 7/2003 Baerlocher et al.
6,612,927 B1 9/2003 Slomiany
D480,961 S 10/2003 Deadman
6,643,124 B1 11/2003 Wilk
6,644,664 B2 11/2003 Muir et al.
6,646,695 B1 11/2003 Gauselmann
6,652,378 B2 11/2003 Cannon et al.
6,659,864 B2 12/2003 McGahn et al.
6,661,425 B1 12/2003 Hiroaki
6,695,696 B1 2/2004 Kaminkow
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,802,777 B2 10/2004 Seelig et al.
6,817,945 B2 11/2004 Seelig et al.
6,817,946 B2 11/2004 Motegi et al.
6,859,219 B1 2/2005 Sall
6,887,157 B2 5/2005 LeMay et al.
6,890,259 B2 5/2005 Breckner et al.
6,906,762 B1 6/2005 Witehira et al.
6,908,381 B2 6/2005 Ellis
6,937,298 B2 8/2005 Okada
6,981,635 B1 1/2006 Hughs-Baird et al.
7,040,987 B2 5/2006 Walker et al.
7,056,215 B1 6/2006 Olive
7,095,180 B2 8/2006 Emslie et al.
7,097,560 B2 8/2006 Okada
7,108,603 B2 9/2006 Olive
7,115,033 B1 10/2006 Timperley
7,128,647 B2 10/2006 Muir
7,159,865 B2 1/2007 Okada
7,160,187 B2 1/2007 Loose et al.
7,166,029 B2 1/2007 Enzminger
7,204,753 B2 4/2007 Ozaki et al.
7,207,883 B2 4/2007 Nozaki et al.
7,220,181 B2 5/2007 Okada
7,227,510 B2 6/2007 Mayer, III et al.
7,237,202 B2 6/2007 Gage
7,252,288 B2 8/2007 Seelig et al.
7,252,591 B2 8/2007 Van Asdale
7,255,643 B2 8/2007 Ozaki et al.
7,274,413 B1 9/2007 Sullivan et al.
7,285,049 B1 10/2007 Luciano, Jr. et al.
7,309,284 B2 12/2007 Griswold et al.
7,322,884 B2 1/2008 Emori et al.
7,324,094 B2 1/2008 Moilanen et al.
7,329,181 B2 2/2008 Hoshino et al.
7,352,424 B2 4/2008 Searle
7,439,683 B2 10/2008 Emslie
7,473,173 B2 1/2009 Peterson et al.
7,505,049 B2 3/2009 Engel
7,510,475 B2 * 3/2009 Loose et al. .................... 463/31
7,558,057 B1 7/2009 Naksen et al.
7,559,837 B1 7/2009 Yoseloff et al.
7,619,585 B2 11/2009 Bell et al.
7,624,339 B1 11/2009 Engel et al.
7,626,594 B1 12/2009 Witehira et al.
7,724,208 B1 5/2010 Engel et al.
7,730,413 B1 6/2010 Engel
7,742,124 B2 6/2010 Bell
7,742,239 B2 6/2010 Bell
7,841,944 B2 11/2010 Wells
7,951,001 B2 5/2011 Wells
8,012,010 B2 9/2011 Wilson et al.
2001/0013681 A1 8/2001 Bruzzese et al.
2001/0016513 A1 8/2001 Muir et al.
2001/0031658 A1 10/2001 Ozaki et al.
2002/0022518 A1 2/2002 Okuda et al.
2002/0045472 A1 4/2002 Adams
2002/0086725 A1 7/2002 Fasbender et al.
2002/0119035 A1 8/2002 Hamilton
2002/0142825 A1 10/2002 Lark et al.
2002/0167637 A1 11/2002 Burke
2002/0173354 A1 11/2002 Winans et al.
2002/0175466 A1 11/2002 Loose et al.
2002/0183105 A1 12/2002 Cannon 2002/0183109 A1 12/2002 McGahn et al.
2003/0026171 A1 2/2003 Brewer et al.
2003/0027624 A1 2/2003 Gilmore et al.
2003/0032478 A1 2/2003 Takahama et al.
2003/0032479 A1 2/2003 LeMay et al.
2003/0045345 A1 3/2003 Berman
2003/0060271 A1 3/2003 Gilmore et al.
2003/0064781 A1 4/2003 Muir
2003/0069063 A1 4/2003 Bilyeu et al.
2003/0087690 A1 5/2003 Loose et al.
2003/0128427 A1 7/2003 Kalmanash
2003/0130026 A1 7/2003 Breckner et al.
2003/0130028 A1 7/2003 Aida et al.
2003/0148804 A1 8/2003 Ikeya et al.
2003/0157980 A1 8/2003 Loose et al.
2003/0176214 A1 9/2003 Burak et al.
2003/0199295 A1 10/2003 Vancura
2003/0220134 A1 11/2003 Walker et al.
2003/0234489 A1 12/2003 Okada
2003/0236114 A1 12/2003 Griswold et al.
2003/0236118 A1 12/2003 Okada
2004/0009803 A1 1/2004 Bennett et al.
2004/0023714 A1 2/2004 Asdale
2004/0029636 A1 2/2004 Wells
2004/0036218 A1 2/2004 Inoue
2004/0063490 A1 4/2004 Okada
2004/0066475 A1 4/2004 Searle
2004/0077401 A1 4/2004 Schlottmann et al.
2004/0102244 A1 5/2004 Kryuchkov et al.
2004/0102245 A1 5/2004 Escalera et al.
2004/0116178 A1 6/2004 Okada
2004/0142748 A1 7/2004 Loose et al.
2004/0147303 A1 7/2004 Imura et al.
2004/0150162 A1 8/2004 Okada
2004/0162146 A1 8/2004 Ooto
2004/0166925 A1 8/2004 Emori et al.
2004/0166927 A1 8/2004 Okada
2004/0171423 A1 9/2004 Silva et al.
2004/0183251 A1* 9/2004 Inoue ........................ 273/143 R
2004/0183972 A1 9/2004 Bell
2004/0192430 A1 9/2004 Burak et al.
2004/0198485 A1 10/2004 Loose et al.
2004/0207154 A1 10/2004 Okada
2004/0209666 A1 10/2004 Tashiro et al.
2004/0209667 A1 10/2004 Emori et al.
2004/0209668 A1 10/2004 Okada
2004/0209671 A1 10/2004 Okada
2004/0209672 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0219967 A1 11/2004 Giobbi et al.
2004/0224747 A1 11/2004 Okada
2004/0227721 A1 11/2004 Moilanen et al.
2004/0233663 A1 11/2004 Emslie et al.
2004/0235558 A1 11/2004 Beaulieu et al.
2004/0239582 A1 12/2004 Seymour
2004/0266515 A1 12/2004 Gauselmann
2004/0266536 A1 12/2004 Mattice et al.
2005/0020348 A1 1/2005 Thomas et al.
2005/0026673 A1* 2/2005 Paulsen et al. .................. 463/16
2005/0032571 A1 2/2005 Asonuma
2005/0037843 A1 2/2005 Wells et al.
2005/0049032 A1 3/2005 Kobayashi
2005/0049046 A1 3/2005 Kobayashi
2005/0062410 A1 3/2005 Bell et al.
2005/0063055 A1 3/2005 Engel
2005/0079913 A1 4/2005 Inamura
2005/0085292 A1 4/2005 Inamura
2005/0153772 A1 7/2005 Griswold et al.
2005/0153775 A1 7/2005 Griswold et al.
2005/0164786 A1 7/2005 Connelly
2005/0176493 A1 8/2005 Nozaki et al.
2005/0192090 A1 9/2005 Muir et al.
2005/0206582 A1 9/2005 Bell et al.
2005/0208994 A1 9/2005 Berman
2005/0233799 A1 10/2005 LeMay et al.
2005/0239539 A1 10/2005 Inamura
2005/0253775 A1 11/2005 Stewart
2005/0255908 A1 11/2005 Wells
2005/0266912 A1 12/2005 Sekiguchi
2005/0285337 A1 12/2005 Durham et al.
2006/0025199 A1 2/2006 Harkins et al.
2006/0058100 A1 3/2006 Pacey et al.
2006/0063580 A1 3/2006 Nguyen et al.
2006/0073881 A1 4/2006 Pryzby
2006/0100014 A1 5/2006 Griswold et al.
2006/0103951 A1 5/2006 Bell et al.
2006/0111179 A1 5/2006 Inamura
2006/0125745 A1 6/2006 Evanicky
2006/0166727 A1 7/2006 Burak
2006/0191177 A1 8/2006 Engel
2006/0256033 A1 11/2006 Chan et al.
2006/0284574 A1 12/2006 Emslie et al.
2006/0290594 A1 12/2006 Engel et al.
2007/0004510 A1 1/2007 Underdahl et al.
2007/0004513 A1 1/2007 Wells et al.
2007/0010315 A1 1/2007 Hein
2007/0057866 A1 3/2007 Lee et al.
2007/0072665 A1 3/2007 Muir
2007/0077986 A1 4/2007 Loose
2007/0105610 A1 5/2007 Anderson
2007/0105611 A1 5/2007 O'Halloran
2007/0105628 A1* 5/2007 Arbogast et al. ................ 463/42
2007/0252804 A1 11/2007 Engel
2008/0004104 A1 1/2008 Durham et al.
2008/0007486 A1 1/2008 Fujinawa et al.
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0064497 A1 3/2008 Griswold et al.
2008/0068290 A1 3/2008 Muklashy et al.
2008/0096655 A1 4/2008 Rasmussen et al.
2008/0108422 A1 5/2008 Hedrick et al.
2008/0113716 A1 5/2008 Beadell et al.
2008/0113745 A1 5/2008 Williams et al.
2008/0113746 A1 5/2008 Williams et al.
2008/0113747 A1 5/2008 Williams et al.
2008/0113748 A1 5/2008 Williams et al.
2008/0113749 A1 5/2008 Williams et al.
2008/0113775 A1 5/2008 Williams et al.
2008/0125219 A1 5/2008 Williams et al.
2008/0136741 A1 6/2008 Williams et al.
2008/0261674 A9 10/2008 Okada
2008/0284792 A1 11/2008 Bell
2009/0036208 A1 2/2009 Pennington et al.
2009/0061983 A1 3/2009 Kaufman et al.
2009/0061984 A1 3/2009 Yi et al.
2009/0069069 A1 3/2009 Crowder, Jr. et al.
2009/0069070 A1 3/2009 Crowder, Jr. et al.
2009/0079667 A1 3/2009 Schlottmann et al.
2009/0082083 A1 3/2009 Wilson et al.
2009/0104989 A1 4/2009 Williams et al.
2009/0258697 A1 10/2009 Kelly et al.
2009/0258701 A1 10/2009 Crowder, Jr. et al.
2009/0280888 A1 11/2009 Durham et al.
2009/0312095 A1 12/2009 Durham et al.
2010/0045601 A1 2/2010 Engel et al.
2010/0115391 A1 5/2010 Engel et al.
2010/0115439 A1 5/2010 Engel
2010/0190545 A1 7/2010 Lauzon et al.
2010/0234089 A1 9/2010 Saffari et al.
2011/0065490 A1 3/2011 Lutnick
2011/0201404 A1 8/2011 Wells
2011/0294562 A1 12/2011 Wilson et al.

FOREIGN PATENT DOCUMENTS

AU 2000PQ9586 8/2000
CA 2265283 9/1999
EP 0 454 423 10/1991
EP 0 484 103 5/1992
EP 0 860 807 8/1998
EP 0 919 965 6/1999
EP 0 997 857 10/1999
EP 1 000 642 A2 5/2000
EP 1 260 928 11/2002

| | | | |
|---|---|---|---|
| EP | 1 282 088 | | 2/2003 |
| EP | 1 391 847 | | 2/2004 |
| EP | 1 462 152 | A2 | 9/2004 |
| EP | 1 492 063 | | 12/2004 |
| EP | 1 826 739 | | 8/2007 |
| GB | 1 464 896 | | 2/1977 |
| GB | 2 120 506 | | 11/1983 |
| GB | 2 253 300 | | 9/1992 |
| GB | 2 316 214 | | 2/1998 |
| GB | 2 385 004 | A | 8/2003 |
| JP | H02-90884 | | 7/1990 |
| JP | H03-20388 | | 2/1991 |
| JP | 04-220276 | | 8/1992 |
| JP | H05-68585 | | 9/1993 |
| JP | 06-043425 | | 2/1994 |
| JP | 07-124290 | | 5/1995 |
| JP | H10-015247 | | 1/1998 |
| JP | 10-234932 | A | 9/1998 |
| JP | 11-000441 | A | 1/1999 |
| JP | H11-137852 | | 5/1999 |
| JP | 2000-300729 | | 10/2000 |
| JP | 2000-350805 | | 12/2000 |
| JP | 2000-354685 | | 12/2000 |
| JP | 2001-062032 | | 3/2001 |
| JP | 2001-238995 | | 9/2001 |
| JP | 2001-252393 | | 9/2001 |
| JP | 2001-252394 | | 9/2001 |
| JP | 2002-085624 | | 3/2002 |
| JP | 2004-089707 | | 3/2004 |
| JP | 2004-105616 | | 4/2004 |
| JP | 2004-166879 | | 6/2004 |
| JP | 2005-253561 | | 9/2005 |
| JP | 2005-266387 | | 9/2005 |
| JP | 2005-266388 | | 9/2005 |
| JP | 2005-274906 | | 10/2005 |
| JP | 2005-274907 | | 10/2005 |
| JP | 2005-283864 | | 10/2005 |
| JP | 2006-043425 | | 2/2006 |
| JP | 2006-059607 | | 3/2006 |
| JP | 2006-346226 | | 12/2006 |
| JP | 2007-200869 | | 8/2007 |
| RU | 2 053 559 | C1 | 1/1996 |
| RU | 2 145 116 | C1 | 1/2000 |
| RU | 29794 | U1 | 5/2003 |
| WO | WO 93/13446 | | 7/1993 |
| WO | 99/42889 | | 8/1999 |
| WO | 99/44095 | | 9/1999 |
| WO | WO 99/53454 | | 10/1999 |
| WO | WO 00/32286 | | 6/2000 |
| WO | 01/15127 | | 3/2001 |
| WO | 01/15128 | | 3/2001 |
| WO | 01/15132 | | 3/2001 |
| WO | WO 01/38926 | | 5/2001 |
| WO | 01/09664 | | 8/2001 |
| WO | WO 02/41046 | | 5/2002 |
| WO | WO 02/084637 | | 10/2002 |
| WO | WO 02/086610 | | 10/2002 |
| WO | WO 02/089102 | | 11/2002 |
| WO | WO 03/001486 | | 1/2003 |
| WO | WO 03/023491 | | 3/2003 |
| WO | WO 03/032058 | | 4/2003 |
| WO | 03/039699 | | 5/2003 |
| WO | WO 03/040820 | | 5/2003 |
| WO | PCT/NZ03/00153 | | 7/2003 |
| WO | WO 03/079094 | | 9/2003 |
| WO | 04/001486 | | 12/2003 |
| WO | WO 2004/001488 | | 12/2003 |
| WO | WO 2004/002143 | | 12/2003 |
| WO | WO 2004/008226 | | 1/2004 |
| WO | WO 2004/023825 | | 3/2004 |
| WO | WO 2004/025583 | | 3/2004 |
| WO | WO 2004/036286 | | 4/2004 |
| WO | WO 2004/079674 | | 9/2004 |
| WO | 2004/102520 | | 11/2004 |
| WO | WO 2005/071629 | A1 | 8/2005 |
| WO | 2006/034192 | | 3/2006 |
| WO | 2006/038819 | | 4/2006 |
| WO | WO 2006/112740 | | 10/2006 |
| WO | WO 2007/040413 | | 4/2007 |
| WO | WO 2008/005278 | | 1/2008 |
| WO | WO 2008/028153 | | 3/2008 |
| WO | WO 2008/048857 | | 4/2008 |
| WO | WO 2008/061068 | | 5/2008 |
| WO | WO 2008/063908 | | 5/2008 |
| WO | WO 2008/063914 | | 5/2008 |
| WO | WO 2008/063952 | | 5/2008 |
| WO | WO 2008/063956 | | 5/2008 |
| WO | WO 2008/063968 | | 5/2008 |
| WO | WO 2008/063969 | | 5/2008 |
| WO | WO 2008/063971 | | 5/2008 |
| WO | WO 2008/079542 | | 7/2008 |
| WO | WO 2009/029720 | | 3/2009 |
| WO | WO 2009/039245 | | 3/2009 |
| WO | WO 2009/039295 | | 3/2009 |
| WO | WO 2009/054861 | | 4/2009 |
| WO | WO 2010/023537 | | 3/2010 |
| WO | WO 2010/039411 | | 4/2010 |

OTHER PUBLICATIONS

European Office Action dated Sep. 13, 2007 in Application No. 05 705 315.9.
International Search Report and Written Opinion, mailed on May 20, 2008 for PCT/US2007/084421.
"Light Valve". [online] [retrieved on Nov. 15, 2005]. Retrieved from the Internet URL http://www.meko.co.uk/lightvalve.shtml (1 page).
"Liquid Crystal Display". [online]. [retrieved on Nov. 16, 2005]. Retrieved form the Internet URL http://en.wikipedia.org/wiki/LCD (6 pages).
Bonsor, Kevin, "How Smart Windows Will Work," Howstuffworks, Inc. 1998-2002, http://www/howstuffworks.com/smart-window.htm/printable. Printed Nov. 25, 2002 (5 pages).
"What is SPD?" SPD Systems, Inc. 2002, http://www.spd-systems.com/spdq.htm. Printed Dec. 4, 2002 (2 pages).
"Debut of the Let's Make a Deal Slot Machine," Let's Make a Deal 1999-2002, http:///www.letsmakeadeal.com/pr01.htm. Printed Dec. 3, 2002 (2 pages).
U.S. Appl. No. 11/849,119, filed Aug. 31, 2007.
U.S. Appl. No. 11/858,695, filed Sep. 20, 2007.
U.S. Appl. No. 11/858,845, filed Sep. 20, 2007.
U.S. Appl. No. 11/858,849, filed Sep. 20, 2007.
U.S. Appl. No. 11/859,127, filed Sep. 21, 2007.
U.S. Appl. No. 11/938,184, filed Nov. 9, 2007.
"SPD," Malvino Inc., www.malvino.com, Jul. 19, 1999, 10 pages.
Bosner, "How Smart Windows Work," HowStuffWorks, Inc.,www.howstuffworks.com, 1998-2004, 9 pages.
Exam Report dated Sep. 21, 2007 from European Application No. 05 705 315.9.
Novel 3-D Video Display Technology Developed, News release: Aug. 30, 1996, www.eurekalert.org/summaries/1199.html, printed from Internet Archive using date Sep. 2, 2000.
Saxe et al., "Suspended-Particle Devices," www.refr-spd.com, Apr./May 1996, 5 pages.
Time Multiplexed Optical Shutter (TMOST): A revolutionary Flat Screen Display Technology, www.vea.com/TMOS.html, Apr. 8, 1999, printed from Internet Archive using date Oct. 6, 1999.
Time Multiplexed Optical Shutter (TMOS): A revolutionary Flat Screen Display Technology, www.tralas.com/TMOS.httnl, Apr. 5, 2001, printed from Internet Archive using date Apr. 11, 2001.
U.S. Appl. No. 11/938,086, filed Nov. 9, 2007.
U.S. Appl. No. 11/877,611, filed Oct. 23, 2007.
Office Action dated Aug. 29, 2007 from U.S. Appl. No. 10/755,598.
Office Action dated Oct. 31, 2007 from U.S. Appl. No. 10/213,626.
Final Office Action dated Mar. 28, 2007 from U.S. Appl. No. 10/213,626.
Office Action dated Apr. 27, 2006 from U.S. Appl. No. 10/213,626.
Final Office Action dated Jan. 10, 2006 from U.S. Appl. No. 10/213,626.
Office Action dated Aug. 31, 2004 from U.S. Appl. No. 10/213,626.
U.S. Appl. No. 09/622,409, filed Nov. 6, 2000, Engel.
U.S. Appl. No. 12/49,284, filed Aug. 3, 2010, Silva.
U.S. Appl. No. 13/027,260, filed Aug. 10, 2011, Wilson.
US Office Action dated Mar. 30, 2010 issued in U.S. Appl. No. 11/938,086.

US Office Action Final dated Aug. 19, 2010 issued in U.S. Appl. No. 11/938,086.
US Office Action dated Dec. 3, 2010 issued in U.S. Appl. No. 11/938,086.
US Notice of Allowance dated Apr. 18, 2011 issued in U.S. Appl. No. 11/938,086.
US Notice of Allowance dated Oct. 7, 2011 issued in U.S. Appl. No. 11/938,086.
U.S. Office Action dated Oct. 9, 2009 issued in U.S. Appl. No. 11/514,808.
U.S. Office Action Final dated Apr. 22, 2010 issued in U.S. Appl. No. 11/514,808.
U.S. Office Action and Examiner Interview Summary dated Oct. 18, 2010 issued in U.S. Appl. No. 11/514,808.
U.S. Office Action Final dated Apr. 27, 2011 issued in U.S. Appl. No. 11/514,808.
U.S. Office Action dated Dec. 2, 2009 issued in U.S. Appl. No. 11/829,852.
U.S. Office Action dated Jul. 14, 2010 issued in U.S. Appl. No. 11/829,852.
U.S. Office Action dated Nov. 14, 2008 issued in U.S. Appl. No. 11/829,853.
U.S. Office Action dated Oct. 31, 2008 issued in U.S. Appl. No. 11/829,849.
U.S. Office Action dated Oct. 5, 2011 issued in U.S. Appl. No. 12/245,490.
US Office Action Final dated Apr. 23, 2008 issued in U.S. Appl. No. 10/755,598.
US Office Action dated Oct. 8, 2008 issued in U.S. Appl. No. 10/755,598.
US Office Action Final dated Jul. 1, 2009 issued in U.S. Appl. No. 10/755,598.
US Office Action Final dated Jan. 22, 2010 issued in U.S. Appl. No. 10/755,598.
US Office Action Final dated Aug. 4, 2010 issued in U.S. Appl. No. 10/755,598.
US Notice of Panel Decision from Pre-Appeal Brief Review dated Dec. 1, 2010 issued in U.S. Appl. No. 10/755,598.
US Office Action dated Mar. 28, 2011 issued in U.S. Appl. No. 10/755,598.
US Office Action Final dated Nov. 8, 2011 issued in U.S. Appl. No. 10/755,598.
US Office Action dated Oct. 31, 2008 issued in U.S. Appl. No. 11/829,917.
US Office Action Final dated Aug. 11, 2009 issued in U.S. Appl. No. 11/829,917.
US Office Action dated Jan. 29, 2010 issued in U.S. Appl. No. 11/829,917.
US Office Action Final dated Aug. 5, 2010 issued in U.S. Appl. No. 11/829,917.
U.S. Office Action dated Jul. 9, 2010 issued in U.S. Appl. No. 11/858,849.
U.S. Office Action Final dated Nov. 30, 2010 issued in U.S. Appl. No. 11/858,849.
U.S. Office Action dated Mar. 22, 2011 issued in U.S. Appl. No. 11/858,849.
U.S. Office Action Final dated Aug. 11, 2011 issued in U.S. Appl. No. 11/858,849.
U.S. Office Action dated Jul. 9, 2009 issued in U.S. Appl. No. 11/858,700.
U.S. Office Action Final dated Jan. 4, 2010 issued in U.S. Appl. No. 11/858,700.
U.S. Office Action Final dated Apr. 7, 2010 issued in U.S. Appl. No. 11/858,700.
U.S. Office Action dated Aug. 5, 2010 issued in U.S. Appl. No. 11/858,700.
U.S. Office Action Final dated Dec. 27, 2010 issued in U.S. Appl. No. 11/858,700.
U.S. Office Action dated Nov. 18, 2011 issued in U.S. Appl. No. 11/858,700.
U.S. Office Action dated Jul. 9, 2009 issued in U.S. Appl. No. 11/858,695.
U.S. Office Action Final dated Jan. 4, 2010 issued in U.S. Appl. No. 11/858,695.
U.S. Office Action Final dated Mar. 29, 2010 issued in U.S. Appl. No. 11/858,695.
U.S. Office Action Final dated Jul. 7, 2010 issued in U.S. Appl. No. 11/858,695.
U.S. Office Action dated Nov. 28, 2011 issued in U.S. Appl. No. 11/858,695.
U.S. Office Action dated Apr. 28, 2011 issued in U.S. Appl. No. 11/858,793.
U.S. Notice of Allowance dated Oct. 12, 2011 issued in U.S. Appl. No. 11/858,793.
U.S. Office Action dated Jul. 9, 2009 issued in U.S. Appl. No. 11/858,693.
U.S. Office Action Final dated Mar. 23, 2010 issued in U.S. Appl. No. 11/858,693.
U.S. Office Action dated Aug. 5, 2010 issued in U.S. Appl. No. 11/858,693.
U.S. Office Action Final dated Feb. 7, 2011 issued in U.S. Appl. No. 11/858,693.
U.S. Notice of Allowance dated Nov. 21, 2011 issued in U.S. Appl. No. 11/858,693.
U.S. Office Action dated Jul. 10, 2009 issued in U.S. Appl. No. 11/858,845.
U.S. Office Action Final dated Feb. 5, 2010 issued in U.S. Appl. No. 11/858,845.
U.S. Notice of Panel Decision from Pre-Appeal Brief Review dated Jun. 8, 2010 issued in U.S. Appl. No. 11/858,845.
U.S. Office Action dated Apr. 7, 2011 issued in U.S. Appl. No. 11/849,119.
U.S. Office Action Final dated Sep. 6, 2011 issued in U.S. Appl. No. 11/849,119.
U.S. Office Action dated Nov. 12, 2010 issued in U.S. Appl. No. 11/859,127.
U.S. Notice of Allowance dated May 4, 2011 issued in U.S. Appl. No. 11/859,127.
U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Jun. 13, 2003 issued in U.S. Appl. No. 09/966,851.
U.S. Office Action dated Mar. 30, 2004 issued in U.S. Appl. No. 09/966,851.
U.S. Office Action Final dated Dec. 14, 2004 issued in U.S. Appl. No. 09/966,851.
U.S. Notice of Allowance dated Jun. 13, 2006 issued in U.S. Appl. No. 09/966,851.
U.S. Office Action dated Sep. 9, 2009 issued in U.S. Appl. No. 11/549,258.
U.S. Office Action Final dated Mar. 26, 2010 issued in U.S. Appl. No. 11/549,258.
U.S. Office Action dated Jul. 9, 2010 issued in U.S. Appl. No. 11/549,258.
U.S. Office Action Final dated Dec. 21, 2010 issued in U.S. Appl. No. 11/549,258.
U.S. Office Action dated Oct. 4, 2011 issued in U.S. Appl. No. 11/549,258.
U.S. Office Action dated Sep. 3, 2010 issued in U.S. Appl. No. 11/938,632.
U.S. Office Action Final dated Dec. 15, 2010 issued in U.S. Appl. No. 11/938,632.
U.S. Notice of Allowance dated May 27, 2011 issued in U.S. Appl. No. 11/938,632.
U.S. Notice of Allowance dated Oct. 5, 2011 issued in U.S. Appl. No. 11/938,632.
U.S. Office Action dated Jun. 23, 2009 issued in U.S. Appl. No. 11/938,184.
U.S. Office Action Final dated Feb. 8, 2010 issued in U.S. Appl. No. 11/938,184.
U.S. Office Action dated Aug. 5, 2010 issued in U.S. Appl. No. 11/938,184.

U.S. Office Action Final dated Jan. 20, 2011 issued in U.S. Appl. No. 11/938,184.
US Office Action dated Nov. 17, 2004 issued in U.S. Appl. No. 10/376,852.
US Office Action dated Apr. 13, 2005 issued in U.S. Appl. No. 10/376,852.
US Office Action Final dated Nov. 18, 2005 issued in U.S. Appl. No. 10/376,852.
US Office Action dated Sep. 19, 2006 issued in U.S. Appl. No. 10/376,852.
US Notice of Informal or Non-Responsive Amendment dated Mar. 9, 2007 issued in U.S. Appl. No. 10/376,852.
US Office Action Final dated Jun. 22, 2007 issued in U.S. Appl. No. 10/376,852.
US Office Action dated Jan. 28, 2008 issued in U.S. Appl. No. 10/376,852.
US Office Action Final dated Aug. 6, 2008 issued in U.S. Appl. No. 10/376,852.
US Office Action dated Feb. 2, 2009 issued in U.S. Appl. No. 10/376,852.
US Notice of Allowance dated Nov. 10, 2009 issued in U.S. Appl. No. 10/376,852.
US Office Action dated Mar. 25, 2010 issued in U.S. Appl. No. 10/376,852.
U.S. Office Action Final dated Aug. 29, 2008 issued in U.S. Appl. No. 10/213,626.
U.S. Office Action dated Jul. 9, 2009 issued in U.S. Appl. No. 10/213,626.
U.S. Notice of Allowance and Examiner Interview Summary dated Mar. 1, 2010 issued in U.S. Appl. No. 10/213,626.
U.S. Notice of Allowance dated Oct. 4, 2010 issued in U.S. Appl. No. 10/213,626.
U.S. Office Action dated May 24, 2007 issued in U.S. Appl. No. 11/167,655.
U.S. Office Action dated Jan. 3, 2008 issued in U.S. Appl. No. 11/167,655.
U.S. Office Action Final dated Mar. 8, 2008 issued in U.S. Appl. No. 11/167,655.
U.S. Office Action Final dated Sep. 2, 2008 issued in U.S. Appl. No. 11/167,655.
U.S. Office Action dated Jul. 17, 2009 issued in U.S. Appl. No. 11/167,655.
U.S. Notice of Allowance dated Mar. 11, 2010 issued in U.S. Appl. No. 11/167,655.
U.S. Notice of Allowance dated Jul. 7, 2010 issued in U.S. Appl. No. 11/167,655.
U.S. Notice of Allowance dated Dec. 10, 2010 issued in U.S. Appl. No. 11/167,655.
U.S. Notice of Allowance dated Apr. 1, 2011 issued in U.S. Appl. No. 11/167,655.
PCT International Search Report dated Apr. 9, 2008 issued in WO 2008/028153.
PCT Written Opinion dated Apr. 9, 2008 issued in WO 2008/028153.
PCT International Preliminary Report on Patentability and Written Opinion dated Mar. 3, 2009 issued in WO 2008/028153.
Australian Examiner's first report dated Jul. 25, 2011 issued in AU 2007289050.
European Examination Report dated Oct. 5, 2009 issued in EP 07 814 629.7.
PCT International Search Report dated Dec. 7, 2009 issued in WO 2010/039411.
PCT International Search Report dated May 25, 2005 issued in WO 2005/071629.
PCT Written Opinion dated May 25, 2005 issued in WO 2005/071629.
PCT International Preliminary Report on Patentability and Written Opinion dated Jul. 17, 2006 issued in WO 2005/071629.
Australian Examiner's First Report dated Nov. 12, 2009 issued in AU2005207309.
Australian Examiner's Report No. 2 dated Sep. 15, 2010 issued in AU Application No. 2005207309.
Chinese First Office Action dated Nov. 28, 2008 issued in CN2005800022940.
Chinese Second Office Action dated Sep. 25, 2009 issued in CN2005800022940.
Chinese Third Office Action dated May 11, 2010 issued in CN2005800022940.
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
Australian Examiner's first report dated Jul. 7, 2011 issued in Au 2007319331.
EP Examination Report dated Oct. 28, 2009 issued in EP 07 845 059.0 1238.
PCT International Search Report dated May 20, 2008 issued in WO 2008/063952.
PCT International Preliminary Report on Patentability and Written Opinion dated May 19, 2009 issued in WO 2008/063952.
Australian Examiner's first report dated Aug. 2, 2011 issued in AU 2007323945.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.
Australian Examiner's first report dated Jul. 25, 2011 issued in AU 2007324000.
European Examination Report dated Oct. 28, 2009 issued in EP 07 844 998.0.
PCT International Search Report dated May 14, 2008 issued in WO 2008/063956.
PCT Written Opinion dated May 14, 2008 issued in WO 2008/063956.
PCT International Preliminary Report on Patentability and Written Opinion dated May 19, 2009 issued in WO 2008/063956.
Australian Examiner's First Report dated Aug. 4, 2011 issued in AU 2007323949.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19, 2009 issued in WO 2008/063908.
Australian Examiner's first report dated Jul. 25, 2011 issued in AU 2007323994.
PCT International Search Report dated Jun. 11, 2008 issued in WO 2008/079542.
PCT Written Opinion dated Jun. 11, 2008 issued in WO 2008/079542.
PCT International Preliminary Report on Patentability and Written Opinion dated May 19, 2009 issued in WO 2008/079542.
Australian Examiner's first report dated Aug. 2, 2011 issued in AU 2007338512.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.

Australian Examiner's first report dated Aug. 2, 2011 issued in AU 2007323964.
European Examination Report dated Oct. 28, 2009 issued in EP 07 845 062.4.
PCT International Search Report dated Dec. 11, 2008 issued in WO 2009/039295.
PCT Written Opinion dated Dec. 11, 2008 issued in WO 2009/039295.
PCT International Preliminary Report on Patentability and Written Opinion dated Mar. 24, 2010 issued in WO 2009/039295.
PCT International Search Report dated Jul. 16, 2008 issued in WO2009/054861.
PCT Written Opinion dated Jul. 16, 2008 issued in WO2009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
European Examination Report dated Sep. 10, 2009 issued in EP 07 853 965.7.
PCT International Search Report dated May 20, 2008 issued in WO2008/063969.
PCT Written Opinion dated May 20, 2008 issued in WO 2008/063969.
PCT International Preliminary Report on Patentability and Written Opinion dated May 19, 2009 issued in WO 2008/063969.
Australian Examiner's first report dated Aug. 19, 2011 issued in AU2007323962.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.
Australian Examiner's first report dated Jul. 29, 2011 issued in AU 2007323961.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
Australian Examiner's First Report dated May 5, 2005 issued in AU2003227286.
Australian Examination Report (as described by Applicant's Attorney) dated Feb. 26, 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
"Living in a flat world?" Deep Video Imaging Ltd. Marketing Brochure, published in 2000 (full date unknown), 8 pgs.
Newton, Harry, Newton's Telecom Dictionary, Jan. 1998, Telecom Books and Flatiron Publishing, p. 399.
"Pointer_Ballistics for Windows XP.pdf" (Oct. 31, 2002), Microsoft,[downloaded on Aug. 27, 2010 from http://www.microsoft.com/whdc/archive/pointer-bal.mspx], 3 pages.
Police 911, Wikipedia, Jan. 22, 2002, retrieved from Internet at http://en.wilkipedia.org/widi/Police_911 on Oct. 28, 2007, 4 pgs.

* cited by examiner

PRESENTATION OF WHEELS ON GAMING MACHINES HAVING MULTI-LAYER DISPLAYS

CROSS REFERENCE TO RELATED APPLICATION

This application claims priority to U.S. Provisional Patent Application No. 60/858,741, filed on Nov. 13, 2006, which is incorporated herein by reference in its entirety and for all purposes.

TECHNICAL FIELD

The present invention relates generally to wager-based gaming machines, and more specifically to the presentation of wheels on processor-based, wager-based gaming machines.

BACKGROUND

A "mechanical reel" type gaming machine can refer to a slot machine having traditional rotating reels with various associated latches and mechanical parts. A mechanical reel usually has a fixed number of reel symbols disposed about a reel strip that is attached about the edge circumference of a wheel, such that the outer edge of the "reel" is viewed. In a purely mechanical gaming machine, a motor, spring, or other mechanical system physically rotates or spins the reel until it stops at a particular rotational position or "reel stop," and a particular reel symbol rests in view of a player to indicate an outcome for that reel for that given reel game. In many older machines, the reels were spun by potential energy first stored in a spring-loaded mechanism wound and then actuated by the pull of a traditional pull-arm handle. Each reel was stopped at a random position by a mechanical device. The slot machine sensed a combined reel outcome, usually along a central payline, by sensing the physical position of each reel. A payout could then be made to the player if the combined outcome was a winning combination.

Later versions of such gaming machines include "electro-mechanical" reel type gaming machines. Such electromechanical reel type gaming machines could include the same or similar physical rotating reels, with the starting, spinning and stopping of each such electromechanical reel being controlled by a stepper motor. One or more microprocessors are used to control the various reel stepper motors. The use of microprocessors and stepper motors generally allows for a wide expansion of "virtual" reel stops for each rotating reel, such that larger payouts and jackpots can be realized over purely mechanical reel type gaming machines. Still further versions include fully electronic or processor based gaming machines that are adapted to present "virtual" or simulated reels on one or more visual or video displays. These electronic or processor-based gaming machines are becoming the norm due to a variety of factors, such as their increased versatility and general appeal to players.

In a typical electronic gaming machine, a game play is initiated through a player wager of money or credit, whereupon the gaming machine determines a game outcome, presents the game outcome to the player and then potentially dispenses an award of some type, including a monetary award, depending upon the game outcome. Electronic and microprocessor based gaming machines can include a variety of hardware and software components to provide a wide variety of game types and game playing capabilities, with such hardware and software components being generally well known in the art. A typical electronic gaming machine can include hardware devices and peripheral such as bill validators, coin acceptors, card readers, keypads, buttons, levers, touch screens, coin hoppers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information.

Advances in technology have resulted in processor-based gaming machines that are increasingly better at emulating actual mechanical reels from a mechanical or electromechanical reel-based gaming machine. Various efforts to simulate or realistically emulate mechanical reels on a video screen of a processor-based gaming machine abound. Some of such efforts can be found at, for example, U.S. Pat. No. 6,887,157, entitled "Virtual Camera and 3-D Gaming Environments in a Gaming Machine," as well as at Japanese Patent Publication No. 2006346226A2, entitled "Game Device and Game Program." Another reference that involves rotating reel games having processors is U.S. Patent Publication No. 2005/0285337, entitled "Dynamic Generation of a Profile for Spinning Reel Gaming Machines," and there are numerous other known instances of machines and systems involving rotating reel games that are controlled at least in part by a microprocessor.

Although simulations of physical reel based games are one popular application for electronic or processor-based gaming machines, it is generally well known that processor-based gaming machines can be used for a wide variety of other wager-based applications. Video poker, video keno and video blackjack are just a few examples of such other applications. Another application can involve the use of one or more spinning wheels, as opposed to rotating reels. In general, while the use of a rotating gaming reel tends to involve the sideways presentation of the reel, such that its outer edge is viewed, the use of a spinning gaming wheel tends to involve a frontal presentation of the wheel, such that a wheel face is viewed. Thus, while symbols or markers on a rotating gaming reel generally appear to move in a linear direction with respect to the player, symbols or markers on a spinning gaming wheel generally appear to move in a circular direction with respect to the player.

Gaming wheels are well-known in the gaming industry. As in the case of gaming reels above, gaming wheels can be purely mechanical, electromechanical and/or purely graphical or "virtual" in nature. One example of a mechanical gaming wheel is a standard roulette wheel, such as that which is used for roulette table games. Other mechanical gaming wheel examples include carnival style vertical wheels, such as that which is used for the game Big Six. Further well known examples of gaming wheels are the various electromechanical and "virtual" wheels that are used with various releases of the Wheel of Fortune® style games for processor-based gaming machines made by International Game Technology of Reno, Nev. ("IGT").

As is generally known, various versions of the Wheel of Fortune® game and other similar wheel type games can include the presentation of a "virtual" wheel on a video display or other visual display type of device on an associated processor-based gaming machine. Such gaming wheel presentations tend to be straightforward graphical presentations, and are often not perceived to be realistic emulations of an actual physical wheel, such as those that can be used as part of a top box diorama or the huge sit-down Wheel of Fortune® Super Spin™ game made by IGT.

While existing designs and systems for providing realistic and entertaining wheel games on processor-based gaming machines, and particularly the presentation of spinning wheels on the video displays thereof, have been adequate in the past, improvements are usually welcomed and encouraged. In light of the foregoing, it is desirable to develop improved processor-based gaming machines that provide a realistic emulation of physical wheels for wheel based games played thereupon.

SUMMARY

It is an advantage of the present invention to provide processor-based gaming machines that are adapted to present wheel-based games thereupon, such that the presented gaming wheels are realistic and appealing to players. This can be accomplished at least in part through the use of simulated or "virtual" gaming wheels that are presented on a specialized multi-layer display at a respective gaming machine or gaming terminal.

In various embodiments of the present invention, a processor-based gaming machine adapted for accepting a wager, playing a game based on the wager and granting a payout based on the result of the game is provided. The gaming machine can include an exterior housing arranged to contain various internal gaming machine components therein, a master gaming controller in communication with various internal gaming machine components and adapted to execute or control one or more aspects of the wager based game, and a display device in communication with the master gaming controller and adapted to present at least one gaming wheel having a plurality of wheel stops distributed thereupon. The display device can be a multi-layer display that includes at least one display controller adapted to generate or transmit one or more display signals, a first display screen in communication with the display controller and adapted to present a first visual display thereupon based on the display signal or signals, and a second display screen in communication with the display controller and adapted to present a second visual display thereupon based upon the display signal or signals. The second display screen can be positioned behind the first display screen such that the first and second visual displays are adapted to combine for a single visual presentation that includes at least one spinning gaming wheel to a viewer thereof.

In various embodiments, the first visual display can include a first portion of a spinning gaming wheel and the second visual display includes a second portion of that same spinning gaming wheel. The combined single visual presentation that includes a spinning gaming wheel can include a graphical representation, a recorded video clip and/or a live video feed of the spinning gaming wheel or wheels.

In addition, the processor-based gaming machine can include one or more speakers in communication with the master gaming controller and adapted to present sounds with respect to a spinning gaming wheel. The speakers can be dedicated wheel speakers located in close proximity to the display of said at least one spinning gaming wheel. The processor-based gaming machine can also include a wheel sound generator in communication with the master gaming controller and/or speakers, with the wheel sound generator being adapted to provide sounds to one or more speakers with respect to said at least one spinning gaming wheel. In addition, a specialized wheel processor in communication with the master gaming controller and/or the display device can be provided, wherein the wheel processor is adapted to vary one or more display parameters of a spinning gaming wheel from one game play to another of wheel-type games presented on the processor-based gaming machine.

Also included can be a network interface coupling the gaming machine to one or more remotely located networked components, with such a network interface being adapted to facilitate the downloading of wheel spin times, wheel sounds, and/or other wheel spin parameters to the gaming machine. In various embodiments, a wager-based system having a plurality of the foregoing gaming machines can be provided. A remote host can be provided with such a system, and a specialized wheel processor and/or other system components can be located on such a remote host.

In still further embodiments, various methods of presenting a spinning gaming wheel on a processor-based gaming machine are provided. Such methods can include the steps of displaying on a multi-layer display device a gaming wheel in a first static, non-spinning position, accepting a monetary value wager from a player, accepting a game-related input from the player, initiating the play of a wager-based game as a result of the game-related input, determining one or more wheel spin parameters for the gaming wheel, and presenting on the multi-layer display the gaming wheel in a spinning motion, wherein such presentation is based at least in part on the determined wheel spin parameters for said gaming wheel. The multi-layer display can be similar to that which is provided above, and the wheel spin parameters can vary from one game play to another of wheel-type games on said processor-based gaming machine in order to provide a more realistic emulation of a physical wheel.

Further process steps can include generating wheel sounds for the gaming wheel, presenting the generated wheel sounds on one or more speakers, displaying on the multi-layer display device the gaming wheel in a second static, non-spinning position, capturing a video clip or feed of an actual physical gaming wheel, and/or providing the video clip or feed to the multi-layer display device for display thereon.

Additional embodiments can include a wager-based gaming machine similar to the foregoing and having a display device adapted to present a plurality of gaming wheels thereupon, wherein the plurality of gaming wheels are viewed in combination to provide a wager-based game outcome. Such a wager based gaming machine can also include at least one specialized wheel processor adapted to vary one or more display parameters of the plurality of gaming wheels from one game play to another of wheel-type games that are played on the wager-based gaming machine. As in the foregoing embodiments, the display device can comprises a multi-layer display having a plurality of display screens positioned front to back with respect to each other, such that a combined visual image is presented.

Such a wager-based gaming machine having a plurality of gaming wheels can have the wheels be arranged in concentric fashion with respect to each other. In various embodiments, a first gaming wheel is presented on a first display screen of a respective multi-layer display device, and a second gaming wheel is presented on a second display screen of that multi-layer display device. Such an arrangement can involve wheels that are arranged concentrically and/or that substantially overlap with each other in a combined visual presentation on first and second display screens. In some embodiments, the first gaming wheel rotates clockwise and the second gaming wheel rotates counterclockwise during the play of a respective game on the wager-based gaming machine. In one or more of the foregoing embodiment, wheel stop positions on both the first gaming wheel and second gaming wheel can be adapted to align to form a multi-wheel payline across both the first and second gaming wheels.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive gaming wheels and methods of presentation therefor.

DETAILED DESCRIPTION

Exemplary applications of apparatuses and methods according to the present invention are described as follows. These examples are being provided solely to add context and aid in the understanding of the invention. It will be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as definitive or limiting in scope or setting. Although these examples are described in sufficient detail to enable one skilled in the art to practice the invention, it will be understood that they are not limiting, such that other embodiments may be used and changes may be made without departing from the spirit and scope of the invention.

Described herein are various processor-based gaming machines and systems that present spinning or rotating wheels. It will be understood that the term "wheel" can be distinguished from the term "reel" in the context of gaming machines and similar devices for purposes of the present invention. In general, a gaming reel can be a circular or cylindrically shaped item that is rotated about an axis for a gaming event such that an outer edge or other outer portion is prominently displayed or otherwise made of interest. Conversely, a gaming wheel can be a circular shaped item that is rotated about an axis for a gaming event such that a side, front face or other suitable play surface is prominently displayed or otherwise made of interest. As will be appreciated, a truly circular shape is not always necessary for such a gaming wheel, as ovals, squares, octagons and other alternative shapes may also be similarly spun such that a front face or other play surface is prominently displayed and made the subject of a game having a variety of stops displayed on a play surface.

The disclosed processor-based gaming machines can include a number of realistic adaptations, such as audio, video and/or physical adaptations, where each contributes to the perception of actual physical wheels. Such gaming machines and systems can include a specialized multi-layer display, one or more specialized wheel processors, and/or one or more dedicated wheel speakers adapted to present emulated physical wheel sounds, which sounds may be presented in stereo for added effect. Such components may be implemented and used individually or in various combinations, as desired.

Gaming Machines

Figure 1:
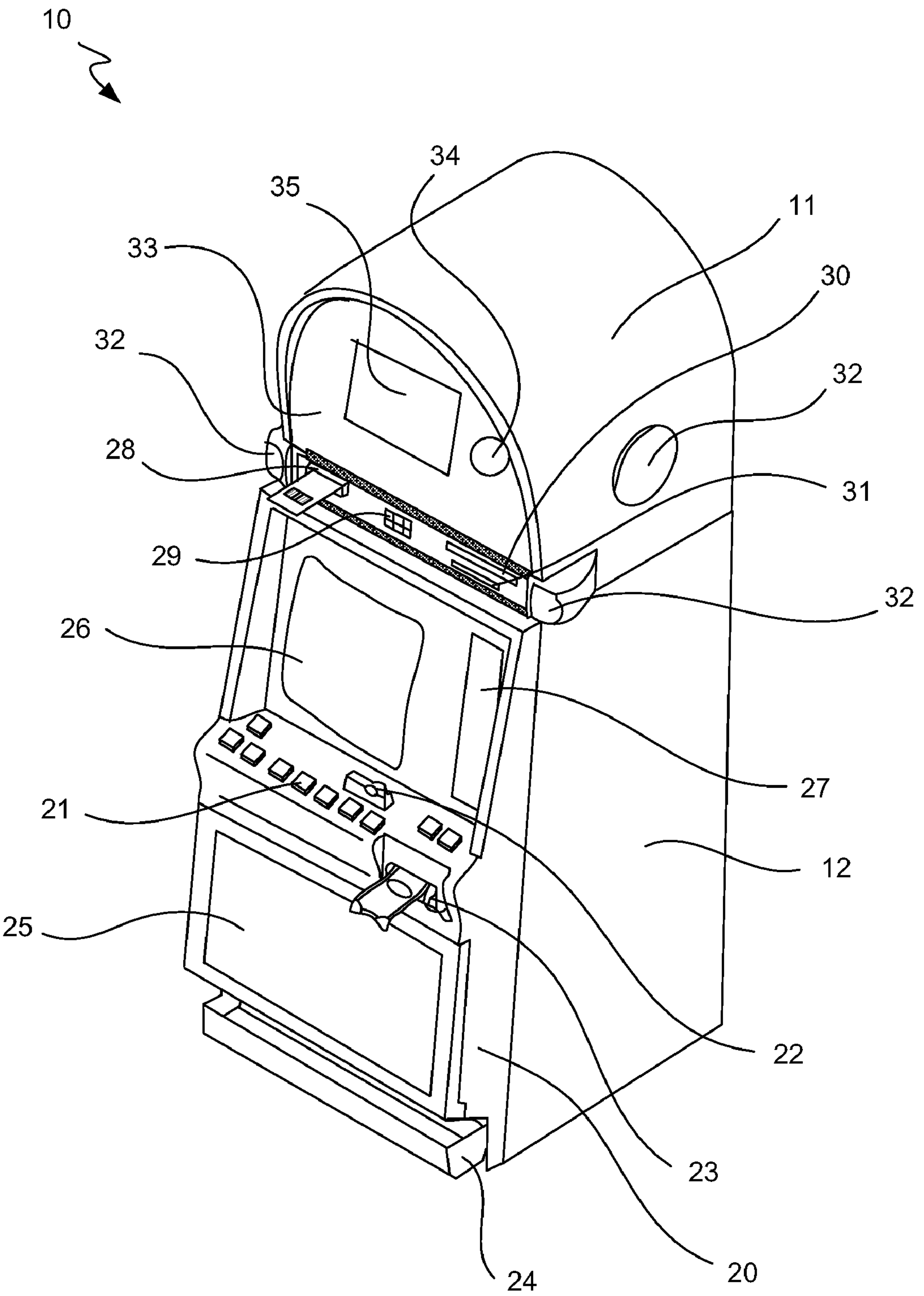
FIG. 1 illustrates in perspective view an exemplary gaming machine.

Referring first to FIG. 1, an exemplary processor-based gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, which collectively form a button panel, one or more money or credit acceptors, such as a coin acceptor 22 and a bill or ticket validator 23, a coin tray 24, and a belly glass 25. Viewable through main door 20 is a primary video display monitor 26 adapted to present a game and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above. In particular, gaming machine 10 can be any of a wide variety of gaming machines manufactured and/or distributed by IGT.

With respect to the basic gaming functionalities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions. In various preferred embodiments, gaming machine 10 can be adapted to present a video simulation of a reel based slots game involving a plurality of gaming reels.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the associated computer system may result. Though most modern general-purpose computers include voltage-monitoring circuitry, these types of circuits only report voltage status to the operating software. Out of tolerance voltages can cause software malfunction, creating a potential unanticipated and/or undesirable condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, USB, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

General Gaming Network and System Configurations

Figure 2:
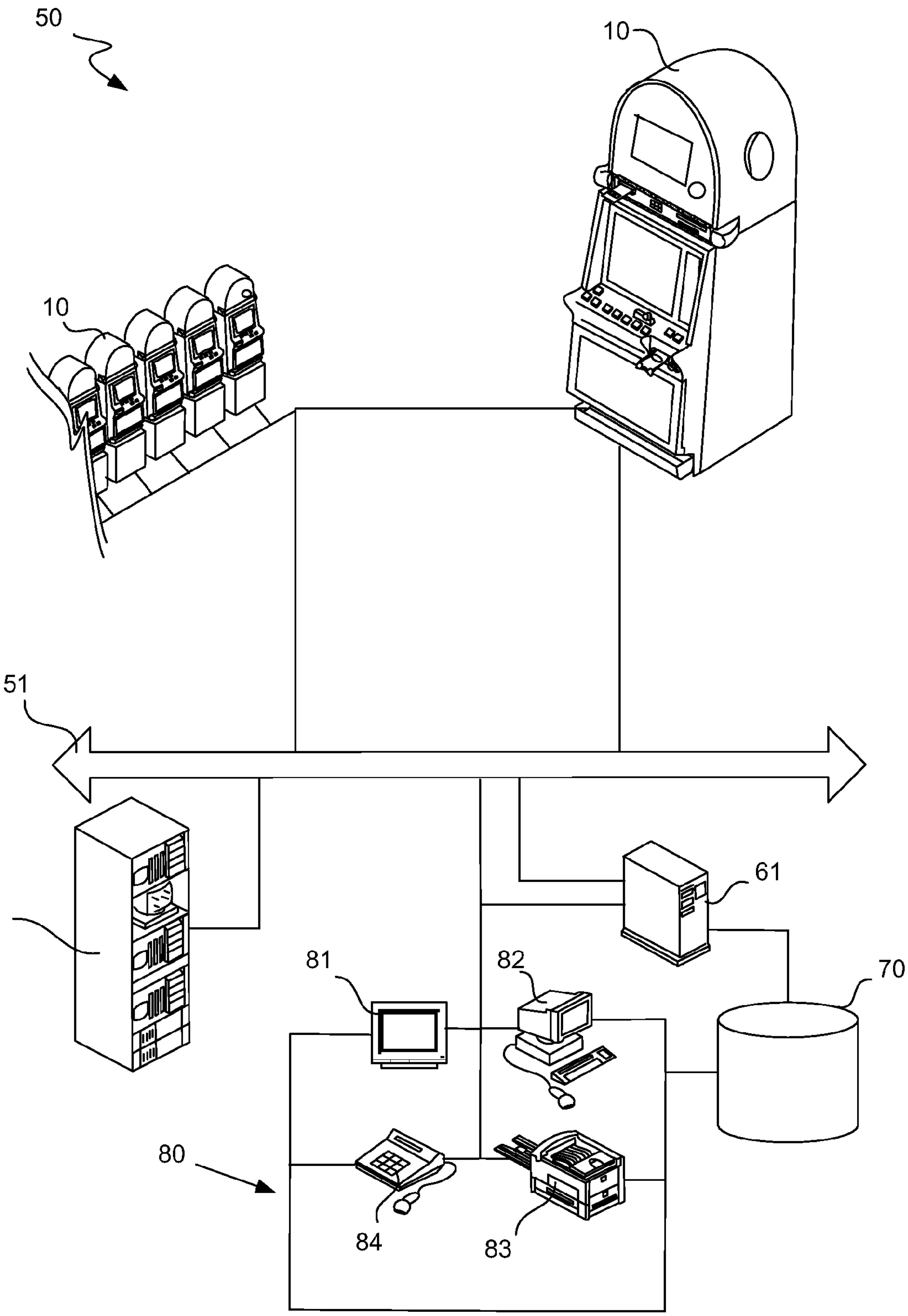
FIG. 2 illustrates in block diagram format an exemplary network infrastructure for providing a gaming system having one or more gaming machines.

Continuing with FIG. 2, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 61, a sub-network of peripheral devices 80, and/or a database 70.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of gaming machine administration and operation under the present methods and systems. Such a special-purpose server or servers could include, for example, a cashless gaming server, a player verification server, a general game server, a downloadable game server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or demarcate some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 61 or another similar component within a general-purpose server 60 also preferably includes a connection to a database or other suitable storage medium 70. Database 70 is preferably adapted to store many or all files containing pertinent data or information for a particular purpose, such as, for example, data regarding visual image data, video clips, other displayable items, and/or related data, among other potential items. Files, data and other information on database 70 can be stored for backup purposes, and are preferably accessible at one or more system locations, such as at a general-purpose server 60, a special purpose server 61 and/or a cashier station or other sub-network location 80, as desired.

In some embodiments, one or both of general-purpose server 60 and special purpose server 61 can be adapted to download various games to one or more gaming machines 10. Such downloaded games can include reel-based slots type games, with various virtual reels, reel symbols and reel stop locations for such symbols being downloaded to the gaming machine or machines 10. Downloaded games can also include wheel-based games, such as any of the wheel-based games disclosed herein and/or any of the various Wheel of Fortune® types of games made by IGT. Such downloads can occur based on a request or command from a player or a casino operator, or can take place in an automated fashion by system 50, such as via a particular prompt or trigger. In the event that virtual reels are downloaded, such items may include one or more files or file portions relating to reel or wheel appearance, timing and/or sounds, as might pertain to the emulation of a given reel-type game or wheel-type game as disclosed herein.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or controller arrangements are added, such as controllers, storage media, and/or other components that may be associated with a dynamic display system adapted for use across multiple gaming machines and devices. In addition to new hardware, new functionality via new software, modules, updates or otherwise can be provided to an existing database 70, specialized server 61 and/or general-purpose server 60, as desired. Other modifications to an existing system may also be necessary, as might be readily appreciated.

Multi Layer Displays

Various embodiments of the present invention relate to the presentation of one or more spinning or moving wheels on a processor-based gaming machine, such as on one or more video or visual displays and one or more accompanying speakers. This can be accomplished at least in part through the use of a specialized multi-layer display adapted for a more realistic presentation of spinning wheels, as well as a specialized wheel processing unit, and/or one or more dedicated wheel speakers adapted to present physical wheel sounds, which sounds may be presented in stereo.

Figure 3:
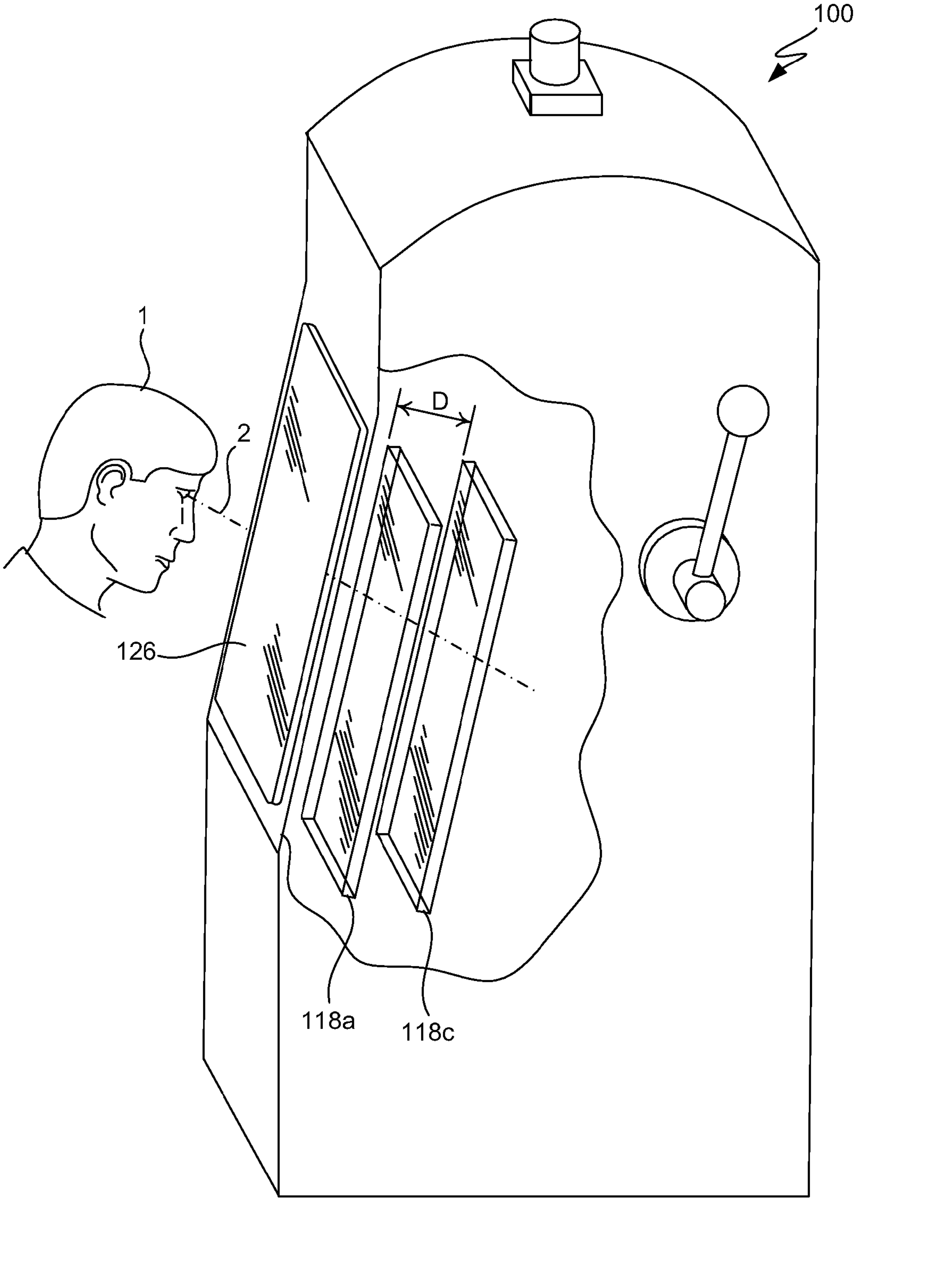
FIG. 3 illustrates in partial perspective and cut-away view an exemplary processor-based gaming machine having a multi-layer display according to one embodiment of the present invention.

Turning now to FIG. 3, an exemplary processor-based gaming machine having a multi-layer display according to one embodiment of the present invention is illustrated in partial perspective and cut-away view. Although the various gaming machines, devices, systems and methods involving more realistic emulations of physical reels and/or wheels set forth herein can be used on many types of processor-based gaming machines or systems, it is specifically contemplated that such devices and techniques can be applied to a gaming machine, terminal or system having a multi-layer display, such as multi-layer display gaming machine 100. It will be readily appreciated that multi-layer display gaming machine 100 can be substantially similar to processor-based gaming machine 10 described above, with the notable exception that a multi-layer display is installed within gaming machine 100.

Such multi-layer displays in a gaming machine can include, for example, those that are from or similar to commercially available products from PureDepth, Inc. of Redwood City, Calif. The PureDepth technology incorporates two or more LCD displays into a physical unit, where each LCD display is separately addressable to provide separate or coordinated images between the LCDs. Many PureDepth display systems include a high-brightened backlight, a rear image panel, such an active matrix color LCD, a diffuser, a refractor, and a front image plane; these devices are laminated to form a stack. The LCDs in these units are stacked at set distances, such as distance "D." As well as the binocular depth cue, PureDepth units feature intrinsic motion parallax, where the x and y distance changes between objects displayed on different video planes depending on viewing angle. In addition, separate focal planes may literally be brought in and out of focus depending on the focal length of the lens in the viewer's eye.

The layered display devices 118*a*, 118*c*, which may be layered LCD devices, for example, may be used in a variety of manners to output games on a gaming machine. In some cases, video data and images displayed on the display devices 118*a* and 118*c* are positioned such that the images do not overlap (that is, the images are not superimposed). In other instances, the images overlap. It should also be appreciated that the images displayed on the display screen can fade-in fade out, pulsate, move between screens, and perform other inter-screen graphics to create additional affects, if desired. Further, although described with respect to LCD screens or devices, it will be readily appreciated that other display technologies may also be adapted for use with respect to such multi-layer displays.

In a specific embodiment, display devices or screens 118*a* and 118*c* display co-acting or overlapping images to a person or viewer 1 looking at the display devices at a front display panel 126 and along a line-of-sight 2. For example, front display screen 118*a* may display paylines in transparent portions that illuminate winning combinations of reels disposed on back display screen 118*c*. With respect to further examples, it is again noted that external loading and changing of simulated reel games can be had with gaming machine 100, such as described above with respect to wager-based gaming system 50. This can permit a casino or gaming establishment to change video or visual images on each of the layered display devices, and their transparency, without physically altering the gaming machine or requiring maintenance. Thus, the number of virtual slot reels may be changed from 3 to 5 to 9, or some other number. In this case, each display device or screen 118*a*, 118*c* can change the position of its viewing window for viewing of the different number of virtual slot reels. Symbols on each virtual slot reel may also be changed. Alternatively, one or more gaming wheels may be used instead of or in conjunction with one or more gaming reels. Various exemplary uses of gaming wheels are set forth in greater detail below. Also, a pay table shown on front display device 118*a* may be changed at will, in addition to changing whether a bonus or progressive game is shown on the back display device 118*c*, for example. This permits the same multi-layer display gaming machine 100 to play new games simply by downloading data onto the machine.

As will be readily appreciated, the layered display devices 118*a*, 118*c* may be used in a wide variety of manners to output games on a gaming machine. In some cases, video data and images displayed on the display devices 118*a* and 118*c* are positioned such that the images do not overlap, while in other instances, the images do overlap. It should also be appreciated that the images displayed on the display screen can fade-in fade out, pulsate, move between screens, and perform other inter-screen graphics to create additional affects, if desired. The multiple display devices may each display their own graphics and images, or cooperate to provide coordinated visual output. Objects and graphics in a game may then appear on any one or multiple of the display devices, where reels and other graphics on the front screen 118*a* blocks the view objects on the back screen 118*c*, depending on the position of the viewer relative to the screens. This provides actual perspective between the graphics objects, which represents a real-life component of 3D visualization.

In some embodiments, the multiple display screens or devices output video or other visual images for different games or purposes. For example, one display device may output a reel game, while another display device outputs a bonus game or pay table associated with the other display, while still another display device provides a progressive game or is reserved for player interaction and video output with a touchscreen. One or more display screens or devices may also present one or more gaming wheels, which may be shown as static, in motion, or preferably both at various times. Other combinations may be used, as may be desired. Furthermore, while the foregoing embodiment has been described with respect to only two screens, it will be readily appreciated that additional screens may also be used for such a multi-layer display. For example, a middle screen (not shown) can be disposed between front layered screen 118*a* and back layered screen 118*c*, with such a middle screen also being adapted for the presentation of a coordinated video presentation or other visual image to a viewer. Still further screens may also be implemented into the multi-layer stack, as desired.

Wager based games output by the display devices or screens in such a multi-layer display may include, for example, any video game emulation that portrays one or more reels. Typically, the gaming machine simulates the rotation of the video reels using motion graphics for the symbols on the reel strips and motion graphics for the mechanical components. In various particular embodiments, the use of multiple screens may be made to account for any special effects or more realistic simulations that are desired through the use of a multi-layer display. For example, reel symbols may be moved from a back display to a front display and then to the back display again as they appear to rotate or spin along their respective virtual reels. Such movement of reel symbols from one screen to another within a multi-layer display can aid in a more realistic emulation of physical mechanical reels on a processor-based gaming machine. Other details regarding the depiction of simulated reels on a multi-layer display can be found in U.S. patent application Ser. No. 11/858,695, filed on Sep. 20, 2007, and entitled "Realistic Video Reels," which application is incorporated herein by reference in its entirety and for all purposes.

Various embodiments of the present invention can involve a more realistic emulation of physical reels though additional visual techniques, which can be used on processor-based gaming machines having multi-layer displays as well as those having more traditional displays, such as a simple CRT, LCD, flat panel display, or the like. Such visual techniques can include varying the timings of reel spin lengths as well as successive reel stops, which timing variances may involve sampling the spins of actual physical reels and modeling virtual reel spin times and successive reel stop times after the sampled physical reel spins. Various levels of randomization may also be introduced into such reel spin and reel stop times, so as to more realistically simulate the slightly varying reel spin and reel stop times of actual physical reels. Instead of and/or in addition to gaming reels, similar techniques may be used in the presentation of one or more emulated spinning gaming wheels.

Various embodiments of the present invention can also involve a more realistic emulation of physical reels and/or wheels though added audio techniques, which audio techniques can be used separately or in combination with one or more of the above visual techniques. Such added audio techniques can include providing audio playback of actual sounds sampled and recorded from rotating physical reels, which replayed sounds can be selected from multiple and/or lengthier sound samplings from mechanical reels that are stored in an associated memory. A separate audio track can be implemented for each virtual reel, and such separate tracks can be directed for play at a plurality of speakers, which play can be stereophonic in nature. Variances in the audio playback can also be similarly randomized, so as to more realistically simulate the slightly varying sounds of actual physical reels in motion. Further details regarding the realistic emulation of reels in a processor-based gaming machine can be found at, for example, and commonly owned U.S. patent application Ser. No. 11/858,845 by Williams, et al, entitled "Multimedia Emulation of Physical Reel Hardware in Processor-Based Gaming Machines," which application is incorporated herein by reference in its entirety and for all purposes. It will be readily appreciated that various teachings of this reference with respect to the presentation of gaming reels can be correlated to the presentation of gaming wheels.

Multimedia Presentation of Gaming Wheels

Various embodiments of the present invention relate to the presentation of one or more moving wheels on a processor-based gaming machine, such as on one or more video or visual displays and one or more accompanying speakers. This can be accomplished at least in part through the use of a specialized multi-layer display adapted for a more realistic presentation of rotating reels, as well as a specialized wheel processing unit, and/or one or more speakers adapted to present physical wheel sounds, which sounds may be presented in stereo.

Figure 4:
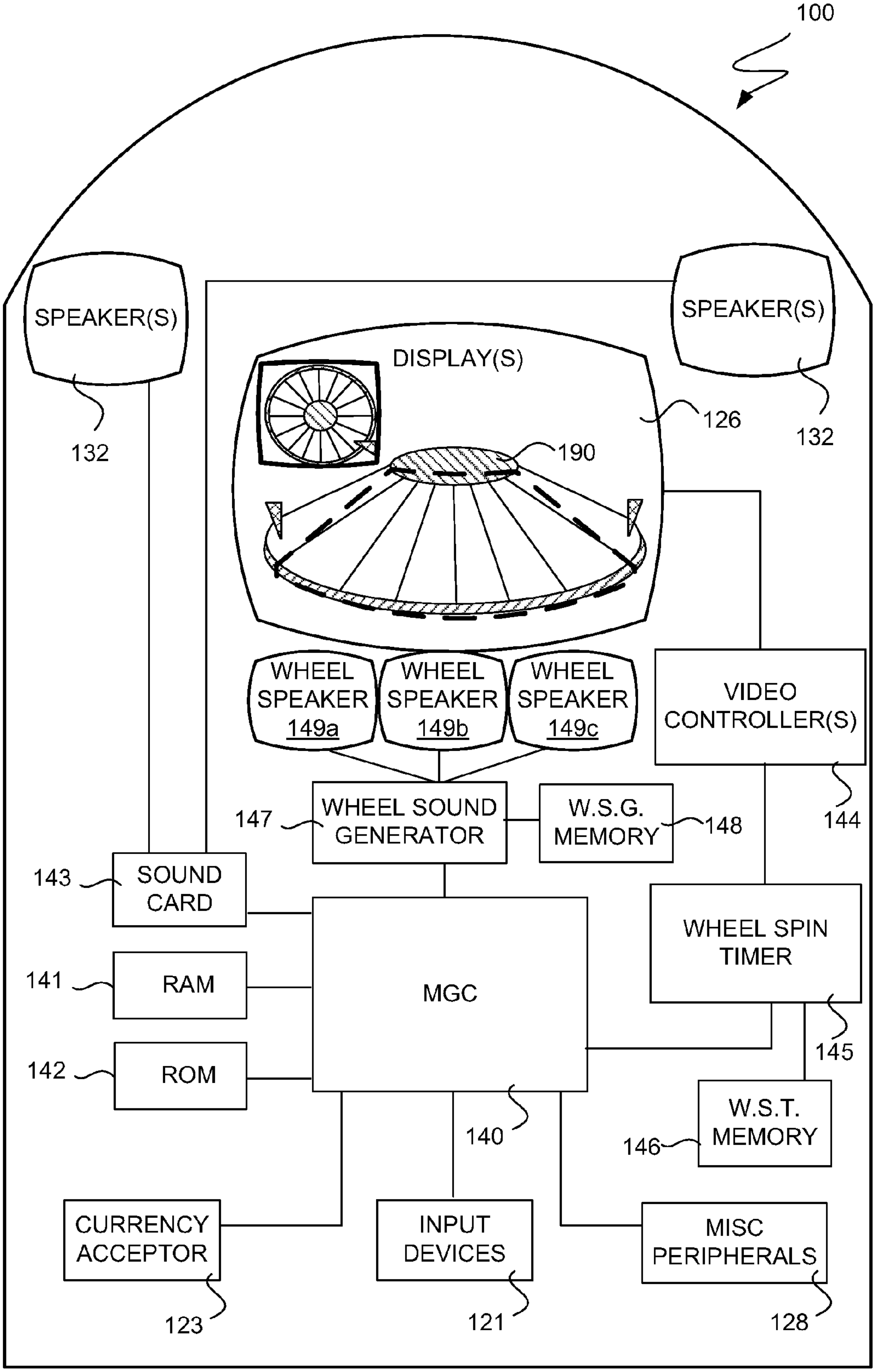
FIG. 4 illustrates in block diagram format various components of an exemplary processor-based gaming machine adapted to provide a realistic emulation of one or more gaming wheels according to one embodiment of the present invention.

Referring next to FIG. 4, various components of an exemplary processor-based gaming machine adapted to provide more realistic emulations of physical wheels both visually and audibly according to one embodiment of the present invention are illustrated in block diagram format. Processor-based gaming machine 100 contains many components that can be similar or identical to those set forth in gaming machine 10 above. For example, general speakers 132, input devices 121 and currency acceptor 123, as well as other peripheral devices 128, can correspond to similar items in gaming machine 10. As noted above, display(s) 126 can include a multi-layer display such as that shown and described with respect to FIG. 3. In some alternative embodiments, however, it will be appreciated that various visual and audio emulation techniques disclosed herein can be presented with respect to a gaming machine having a more traditional display, rather than a multi-layer display.

One or more sound cards 143 can be used to drive general speakers 132, and one or more video cards or controllers 144 can be used to drive display(s) 126, which display(s) can be adapted to present a gaming wheel 190 in one or more suitable views. In various embodiments involving multi-layer displays, multiple video cards or controllers 144 can be used, such as one video card or controller for each separate screen, as will be readily appreciated. Alternatively, one video card or controller can be used to drive multiple screens within a multi-layer display.

As noted above, a master gaming controller 140 adapted to execute or control one or more aspects of wager based games is in communication with various other gaming machine components, either directly or via other components. For example, while master gaming controller 140 might be in direct communication with various input devices or other peripherals, one or more video cards or controllers 144 can be interspersed between the master gaming controller and display(s) 126, such that communication to the display(s) is indirect. Various memory or storage components, designated as RAM 141 and ROM 142 might be accessible to master gaming controller 140, and such storage components may be dedicated to the master gaming controller, or could be shared by other gaming machine components.

In addition to a multi-layer display, various other specialized components adapted to aid in a more realistic emulation of physical wheels can be a part of processor-based gaming machine 100. Such components can include a specialized wheel spin timer or other specialized wheel processor 145 and associated memory 146, a specialized wheel sound generator 147 and associated memory 148, and a plurality of wheel speakers 149*a*, 149*b*, 149*c* adapted to present simulated physical wheel sounds. These speakers 149 can be dedicated wheel speakers, in that such speakers are used only to present wheel sounds. Accordingly, wheel speakers 149 can be located just beneath display 126. Other locations for dedicated wheel speakers 149 may also be used, such as on the underside of a player input panel, and/or behind a belly glass or top glass. In addition, a plurality of separate audio channels may be used, such as one separate audio channel per dedicated wheel speaker 149. In this manner, sounds to the various dedicated wheel speakers can be presented in stereo for added effect. In alternative embodiments, dedicated wheel speakers are not used, and various sound emulations can be presented at general speakers 132.

One or both of wheel spin timer 145 and wheel sound generator 147 can be dedicated specialized wheel processors located separately from master gaming controller 140, as shown in FIG. 4, so as to alleviate some of the burdens that are typically placed on the master gaming controller of a wager-based gaming machine. Such a separate processor or processors could be, for example, the Pentium III processor chip made by Intel Corporation of Santa Clara, Calif., although other suitable processors can also be used. Alternatively, one or both of the wheel spin timer and wheel sound generator can be contained within or even be a part of the master gaming controller itself (not shown). Wheel spin timer 145 may be in communication with master gaming controller 140, one or more video controller(s) 144 and/or one or more display(s) 126, while wheel sound generator 147 can be in communication with master gaming controller 140, one or more sound cards (not shown) and/or one or more dedicated wheel speakers 149*a*, 149*b*, 149*c*. Wheel sound generator 147 may also be in communication with sound card 143 and/or general speaker(s) 132, particularly where dedicated wheel speakers are not used.

One or more wheel spin timer storage units or memory devices 146 can be associated with wheel spin timer 145, and such memory devices 146 can be dedicated to the wheel spin timer or shared with other gaming machine components. Similarly, one or more wheel sound generator storage units or memory devices 148 can be associated with wheel sound generator 147, and such memory devices 148 can be dedicated to the wheel sound generator or shared with other gaming machine components. Such wheel spin timer memory device(s) 146 and wheel sound generator memory device(s) 148 could be separate specific memory chips and/or also an internal hard disk drive, such as, for example, a 40 gigabyte model 6K040L0 hard drive made by Maxtor Corporation of Milpitas, Calif., although other suitable memory components can also be used. In some embodiments, both wheel spin timer memory device(s) and wheel sound generator memory device(s) can be contained on the same set of memory chips and/or hard drive (not shown).

Wheel spin timer memory device(s) 146 can be used to store various files and data with respect to different timings involved in the presentation of a virtual wheel or wheels, such as, for example, the length, speed, acceleration and/or deceleration of wheel spins. Such files and/or data can contain formulae and/or table data for simulated wheel spin parameters, as well as data from sampled timing patterns of actual mechanical wheels. Wheel sound generator memory device(s) 148 can be used to store various files and data with respect to the various simulated sounds involved in the presentation of gaming wheels, such as, for example, the sounds of spinning physical wheels, latches, stepper motors, solenoid actuations, brakes and other mechanical sounds that may be associated with the operation of a physical wheel or wheels. Such files and/or data can contain sound samplings or recordings from actual physical wheels, as well as formulae and/or table data to readily facilitate randomized selections of such sound samplings for a more realistic audio emulation of physical wheels.

Through the use of the various components described above with respect to processor-based gaming machine 100, a more accurate emulation of a physical wheel or wheels can be had with respect to varying timings of wheel starts, speeds, accelerations, spin times, decelerations and stops, among other parameters. Wheel spin timer 145 can be used to control or facilitate the control of various wheel spin parameters for one or more virtual wheels 190 presented on display 126 of gaming machine 100. In some embodiments, wheel spin timer 145 can facilitate the control of spin times for any and all virtual wheels presented for a given wheel type game. Such wheel spin parameters can be selected randomly from a set of acceptable parameter values for each category, and each such time duration, speed, acceleration rate, interval and so forth can be selected separately for each separate virtual wheel in a given wheel game presentation. As noted above, wheel start, spin duration and stop times can be sampled from actual physical wheels, with the specific results being stored in a table or other data format for random selection by wheel spin timer 145.

Through the use of the various components described above with respect to processor-based gaming machine 100, a more accurate emulation of one or more physical gaming wheels can be had with respect to the audio presentations that correspond to one or more gaming wheels 190 during game play. Wheel sound generator 147 can be used to generate or facilitate the generation of simulated physical wheel sounds corresponding to one or more gaming wheels 190. As noted above, physical wheel sounds can be sampled from actual physical wheels, with the specific results being recorded and stored on various files, such as, for example, .wav files, that can be located on wheel sound generator memory 148 or any other suitable associated memory. Wheel sound generator can retrieve various wheel sound files or portions of wheel sound files from associated memory 148, and then distribute or facilitate the distribution of wheel sounds to one or more speakers, such as dedicated wheel speakers 149*a*, 149*b*, 149*c*.

In various embodiments, the stored recordings of actual physical wheels can include multiple and/or lengthy sound recordings, such that snippets or portions of a given sound recording file can be selected randomly for any specific sound playback and emulation. For example, the general sounds of an actual physical wheel spin, accompanying stepper motor whine and other associated mechanical sounds can be recorded for ten seconds, twenty seconds, or more, and such a recording can then be stored on one or more files and sampled from randomly whenever accompanying sound for a spinning gaming wheel is to be provided, such as for the few seconds that such a virtual wheel actually spins during game play.

In various embodiments, wheel sound generator 147 can also be used to modify the sounds that are recorded in the various sound files, so as to provide even more realistic emulations of the sounds of physical wheels. Such sound processing can include generally randomizing the various tones, length, pitch or content of sounds from one simulated wheel spin to the next. For such purposes, wheel sound generator 147 may include a digital sound processor adapted for the dynamic presentation and/or modification of sounds from recorded sound files.

In some embodiments where one or more speakers are adapted to provide stereo sound, for example, with respect to accurate sound emulations of spinning wheels, such stereo speakers may also be used for other dynamic presentations on the gaming machine. Since gaming machine 100 is a processor-based gaming machine, it will be readily appreciated that a wide variety of displays and special effects can be provided. Various displays can involve animated wheel symbols or stops, figures or other objects, which items may move across the display 126. In embodiments that include a multi-layer display, such animated wheel symbols or other objects can also be adapted to move back and forth depthwise between the various screens of the multi-layer display. In the event that stereophonic sounds are provided on multiple speakers, such speakers can be used to provide sounds that are in sync with the motions of such animated wheel symbols or other objects. For example, an animation that involves a wheel symbol or object moving from left to right across screen 126 might be accompanied by sounds that move from wheel speaker 149*a* to wheel speaker 149*b* to wheel speaker 149*c* as the object moves across the screen. Again, while dedicated wheel speakers 149*a*, 149*b*, 149*c* may be used to present stereo sounds and/or sounds with respect to the various gaming wheels 191, other general speakers 132 may also be used for such purposes.

It will be readily appreciated that the various disclosures herein with respect to processor-based gaming machines, virtual and other gaming wheels and methods involving the more realistic emulation of physical wheels can also be applied to wager-based gaming systems having networked gaming machines and other network components. Such systems can include components and configurations such as those described above with respect to FIG. 2. In particular, such a wager-based gaming system can include a remote host that is in communication with some or all of the processor-based gaming machines, with the remote host being adapted to download wheel spin times, values, tables, sound files, and/or other wheel parameters or any combination thereof to the networked gaming machines. Where gaming machines are to be networked in such a wager-based gaming system, various gaming machine embodiments can also include a network interface (not shown) coupling the gaming machine to the system and its various remotely located networked components. Such a network interface would preferably facilitate the downloading of the various items listed above to the networked gaming machines. Such items can be stored, for example, at database 70, and then be made available to various gaming machines within the gaming system.

Various wheel spin parameter determinations and/or wheel sound generations can be done by a network component, such as at the remote host, or within an individual gaming machine. Accordingly, a wheel spin timer or other specialized processor and/or wheel sound generator may be located at the remote host, or elsewhere within the gaming system and outside of an individual gaming machine. Such a remotely located wheel spin processor and/or wheel sound generator could be beneficial to an overall system, particularly where such a system might have gaming machines that are not equipped with specialized wheel spin processors and/or wheel sound generators themselves. For example, where it is desirable for a system gaming machine to provide a realistic wheel-type game having virtual wheels, then the system can provide the various functions of a wheel spin processor and/or wheel sound generator where the system gaming machine does not have one or both of these components and is not otherwise equipped to provide such functions itself.

In some embodiments, wheel spin timers or processors and/or wheel sound generators can be located both within individual gaming machines, as detailed above, and also on one or more system components, such as at a remote host. Whether a wheel spin processor and/or wheel sound generator is located on a system component or within a gaming machine, it is preferable that such a wheel spin processor and/or wheel sound generator be able to facilitate the provision of realistic wheels on an associated display, particularly through the use of one or more timing and/or recorded sound files, which files can be stored on an associated internal gaming machine memory 146, 148 and/or at a network location, such as at system database 70.

Wheel Presentations for Wheel Based Gaming Machines

As noted above, a suitable multi-layer display device can be used advantageously in a variety of ways to provide a more realistic—and even three-dimensional—presentation of one or more spinning gaming wheels thereupon within the context of a processor-based gaming machine. Such gaming wheels might be, for example, a roulette wheel or equivalent and/or any video or graphical version of the popular Wheel of Fortune® wheel manufactured by IGT.

In a roulette example, a center of the distance between the layered displays may be set as the center of the roulette wheel. Numbers on the perimeter of the roulette wheel may then move in and out between the front display and back display. This can creates a 3-D effect where the numbers on the roulette wheel actually approach and retreat from a person standing in front a game machine.

In various embodiments, a Wheel of Fortune® game can use a gaming wheel that is displayed between the layered displays. Similar to the roulette wheel described above, a center of the distance between the layered displays may be set as the center of the wheel for the Wheel of Fortune® game. In one example, dollar values can move between the layered displays towards and away from a player. The actual position on the Wheel of Fortune® that the pointer stops on may be highlighted or emphasized by the other of the layered displays to enhance visual appeal. Letters for the word or phrase being solved may jump back and forth from the front and distal displays. The letters may even turn over using 3-D effects between the layered displays. In one specific embodiment, the characters in the game show can be displayed on the front display panel or screen while the word or phrase being solved appears on the back panel. In another specific embodiment, the Wheel of Fortune® wheel can appear on the front display screen while the word or phrase being solved appears on the back panel. It will be readily appreciated that a wide variety of other Wheel of Fortune® arrangements are suitable for use with multi-layered displays.

Figure 5A:
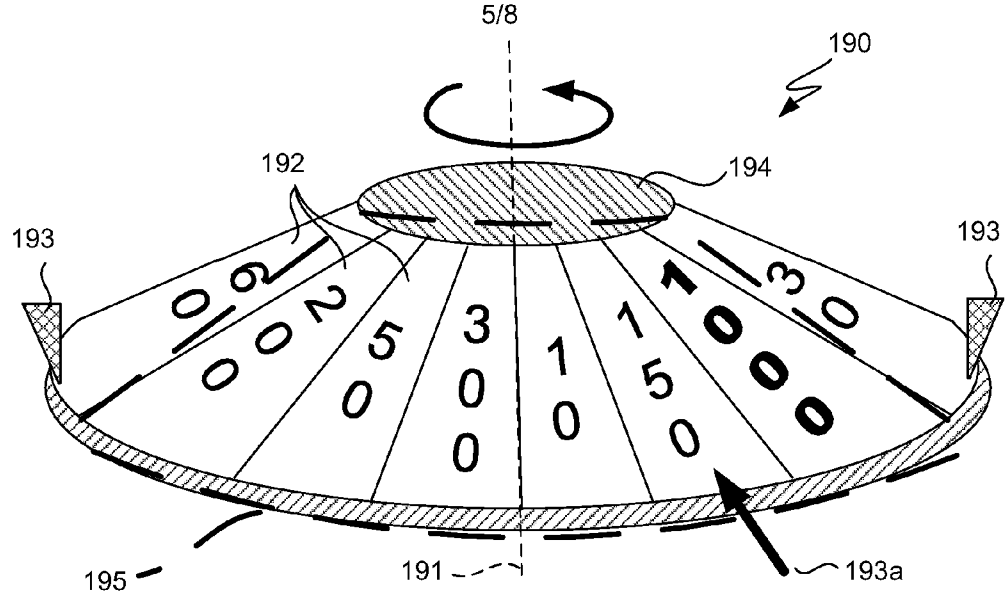
FIG. 5A illustrates a simulated display in side perspective view of an exemplary virtual gaming wheel for use in a processor-based gaming machine having a multi-layer display according to one embodiment of the present invention.

Turning now to FIG. 5A a simulated display of an exemplary virtual gaming wheel for use in a processor-based gaming machine having a multi-layer display is illustrated in side perspective view. As shown, gaming wheel 190 spins about a central axis 191 such that any of a number of wheel stops 192 can come to rest at one or more pointers or indicators 193 when the wheel stops spinning. The visible face of gaming wheel 190 is partially raised into a conical shape, such that a raised center portion 194 is created. Center portion 194 may or may not include center wheel stops (not shown) for the play of a suitable wheel based game. In the event that no wheel stops are used on raised center portion 194, then a logo or other design may be used instead. Although the visible face of gaming wheel 190 is partially raised, it will be readily appreciated that gaming wheels with substantially flat faces or other suitable shapes may also be used.

A particular pointer 193*a* can be indicated for a player viewing the gaming wheel 190 at the angle presented. As shown, pointer 193*a* for the subject player indicates that a wheel stop having a value of "150" is the current wheel spin outcome. Other pointers 193 may apply for other players, and it will be readily appreciated that multiple players may play a game involving wheel 190 simultaneously. In addition, although gaming wheel 190 is shown as spinning in a counterclockwise direction, alternative gaming wheels that spin in the opposite direction may also be used.

As noted above, gaming wheel 190 may be presented on multiple screens of a single multi-layer display device. For example, the portion of gaming wheel bounded by broken line 195 can be displayed on a front display screen, while the remainder of the gaming wheel can be displayed on a back display screen of a multi-layer display. In this manner, the back part of raised center portion 194 and the back wheel stops having values of "60" and "30" can all be presented on a back display screen, and the remaining front portion of the wheel can appear to "jump out" at the player by residing on a front display screen. As the wheel spins, the "60" value wheel stop would then jump from the back to the front screen, while the "1000" value wheel stop would jump from the front to the back screen.

Figure 5B:
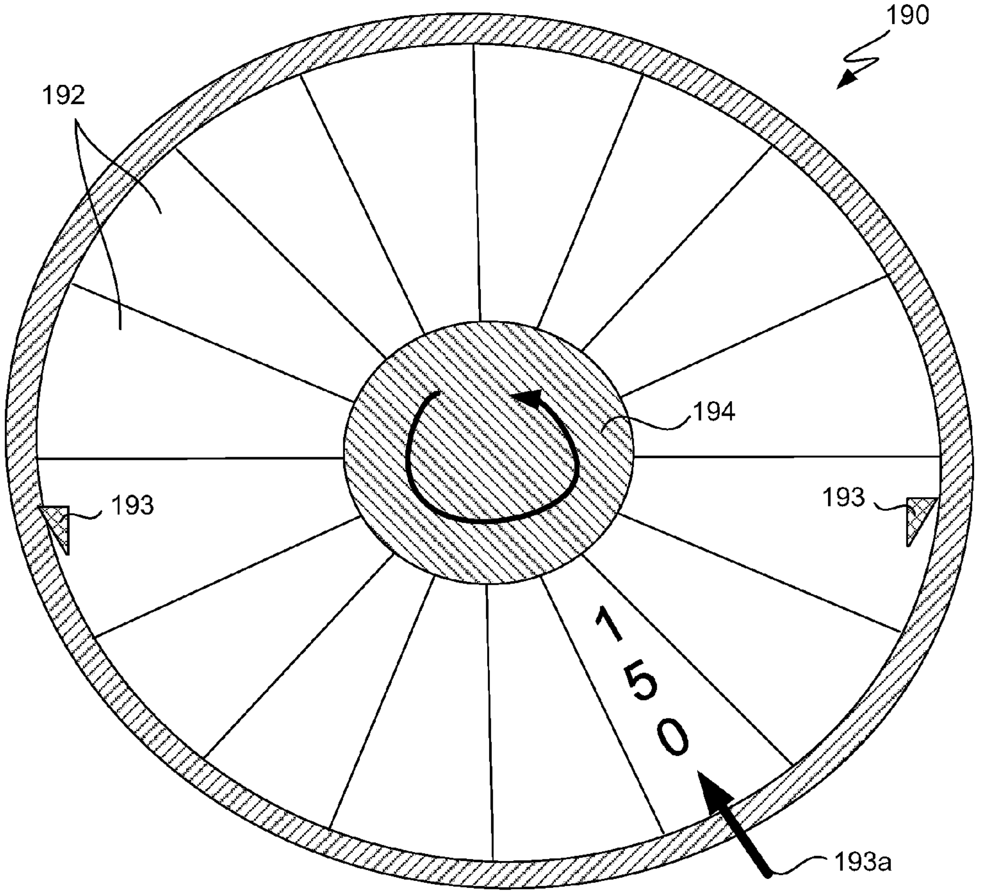
FIG. 5B illustrates a simulated display in top plan view of the exemplary virtual gaming wheel of FIG. 5A.
Figure 5C:
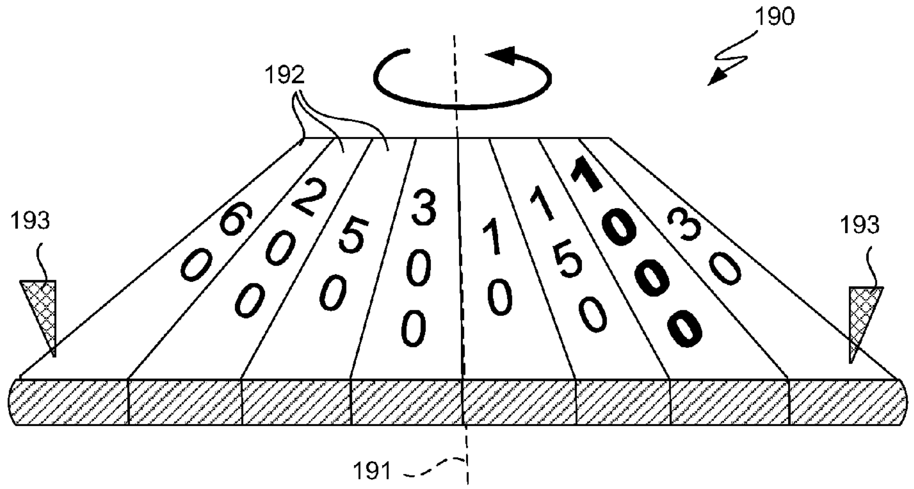
FIG. 5C illustrates a simulated display in side elevation view of the exemplary virtual gaming wheel of FIG. 5A.

FIG. 5B illustrates the exemplary virtual gaming wheel of FIG. 5A in top plan view, while FIG. 5C illustrates the same exemplary virtual gaming wheel in side elevation view. It will be appreciated that many of the various wheel stop values have not been provided in this figures, so as not to unduly clutter that which is being shown. Although it is thought that the view shown in FIG. 5A is a superior view for purposes of game play, various embodiments of the present invention allow a player to select which view of gaming wheel 190 is shown for game play.

Figure 5D:
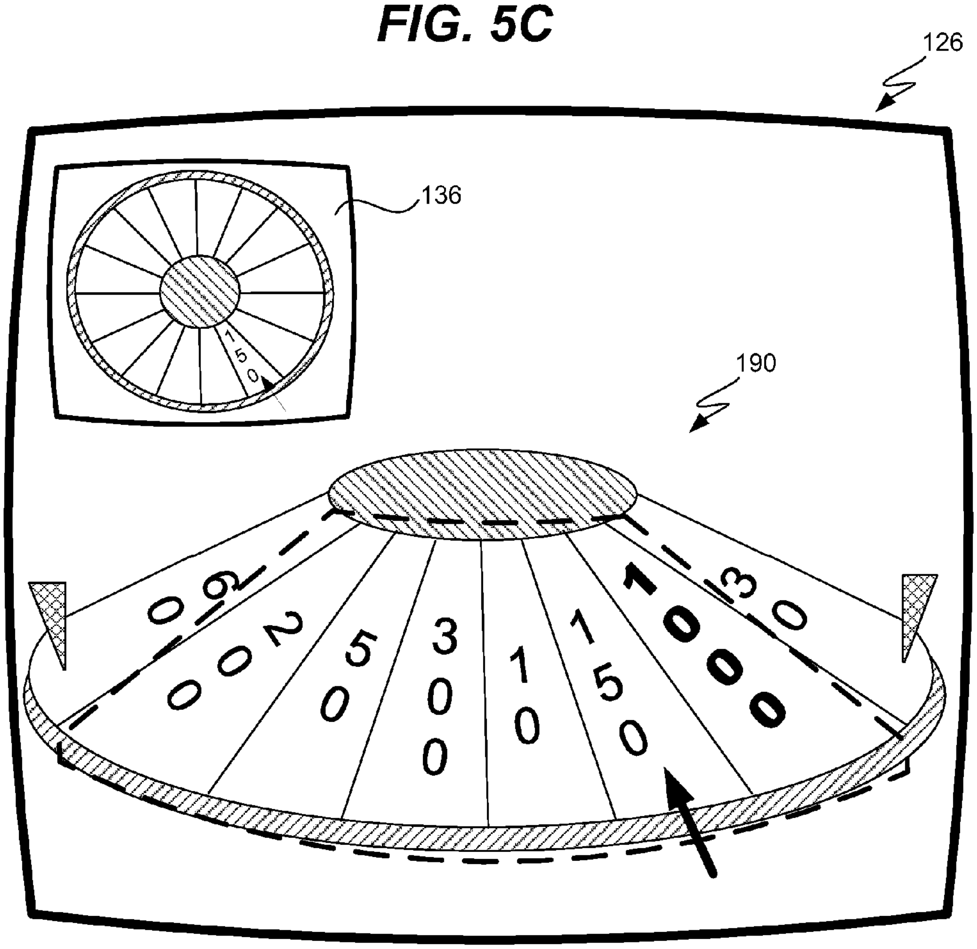
FIG. 5D illustrates a simulated combination display in side perspective and top plan views of the exemplary virtual gaming wheel of FIG. 5A.

FIG. 5D illustrates a simulated combination display in side perspective and top plan views of the exemplary virtual gaming wheel of FIG. 5A. Such a combination display 126 might also be provided as a player selection, as in the views of FIGS. 5B and 5C. As shown in FIG. 5D, a side perspective view may dominate the display screen, with an inset portion 136 being used to provide an alternative view of the gaming wheel 190—in this case a top plan view. Again, the player may be allowed to choose which view is shown as the dominant screen view of display 126 and which view is shown in the inset portion 136.

In various embodiments gaming wheel 190 may be a graphical creation, as in the case of a purely virtual wheel. In further embodiments, gaming wheel 190 may be a video or visual depiction of an actual physical gaming wheel, such as, for example, an actual roulette wheel or Wheel of Fortune® wheel. In such instances, one or more cameras (not shown) may be used to capture images and/or video of the actual physical wheel or wheels, which may be remotely located from the gaming machine. Such captured images and/or video clips can then be transmitted to the gaming machine and shown on display 126 to present the subject physical wheel.

In the event that multiple cameras are used, a first camera can be used to focus on and capture a back or rear region of the subject gaming wheel, which a second camera can be used to focus on and capture a front region of the gaming wheel. These two separate images, feeds or clips can then be appropriately provided for display on the front and back screens of an associated multi-layer display on the gaming machine. In some embodiments, recorded clips can be made of the actual gaming wheel, and such clips can then be played back as appropriate during game play at the gaming machine. In other embodiments, one or more live video feeds of the actual gaming wheel may be provided for display at the multi-layer display. In either situation, the subject gaming machine can be used as part of a multi-player station system that may be associated with an actual physical gaming wheel.

In the event that more than one gaming wheel is presented, such a plurality of gaming wheels may be used in combination to present a game and/or game outcome. Continuing now to FIG. 6A, a simulated display of one exemplary set of concentric virtual gaming wheels adapted for the play of an associated game according to one embodiment of the present invention is shown in top plan view. Combined gaming wheel 290 includes an outer gaming wheel 296 and inner gaming wheel 294 arranged in concentric fashion with respect to each other. Similar to foregoing embodiments, outer wheel 296 includes a plurality of wheel stops. Inner wheel 294 can also be seen to include a plurality of smaller wheel stops.

As shown, outer wheel can rotate clockwise, while inner wheel can rotate counterclockwise during an associated game play. An indicator or pointer 293*a* can be used to designate the appropriate wheel stop or aligned payline when one or both wheels stop during or after game play. Although pointer 293*a* points to a single wheel stop on outer wheel 296, an extended broken line also indicates where a payline through multiple wheel stops on both inner and outer wheels may be created. It will also be appreciated that various components of one or both wheels may be presented with respect to one or more screens of a multi-layer display. For example, one wheel may be presented on a front screen while the other wheel may be presented on the back screen of a multi-layer display.

Figure 6A:
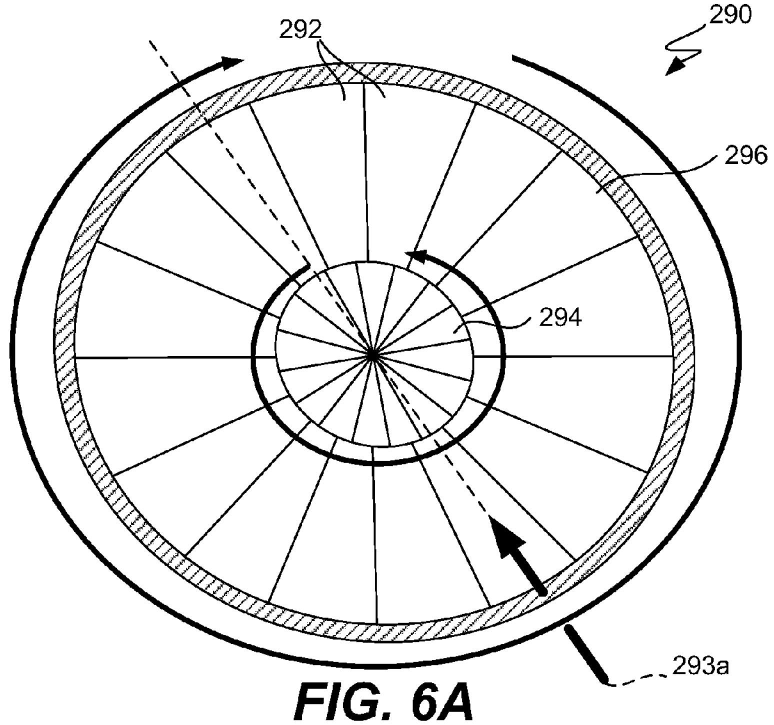
FIG. 6A illustrates a simulated display in top plan view of one exemplary set of concentric virtual gaming wheels adapted for the play of an associated game according to one embodiment of the present invention.
Figure 6B:
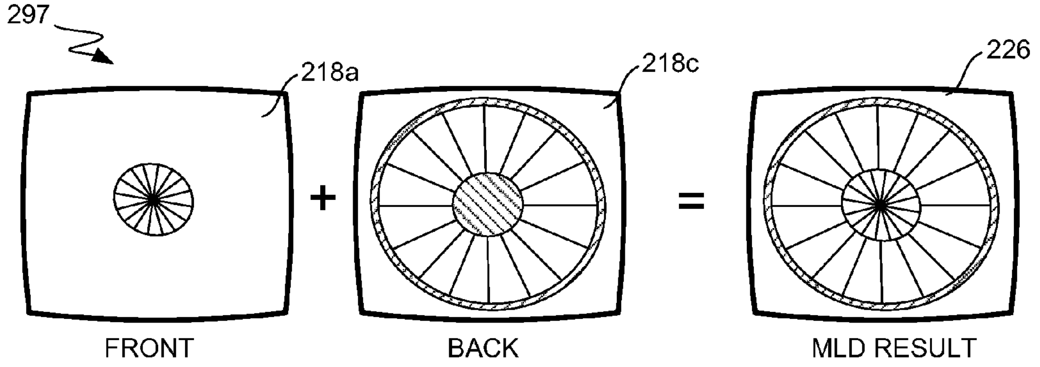
FIG. 6B illustrates one exemplary set of front screen, back screen and resulting combination screen presentations that can be used to form the simulated display of concentric virtual gaming wheels of FIG. 6A.
Figure 6C:
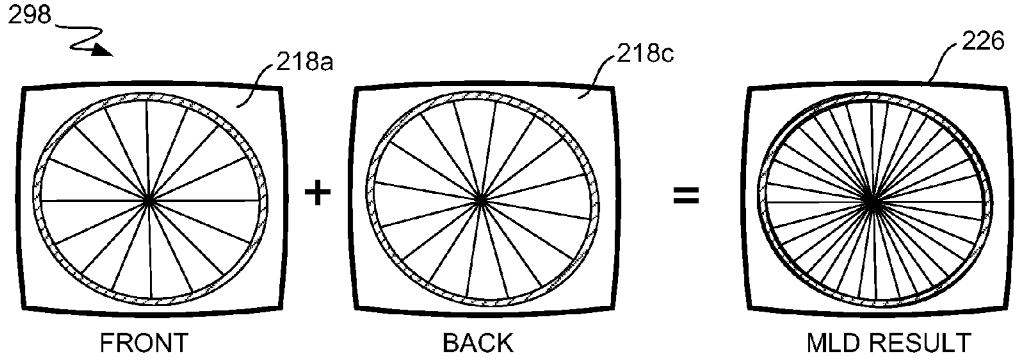
FIG. 6C illustrates one exemplary set of front screen, back screen and resulting combination screen presentations that can be used to form an alternative simulated display of virtual gaming wheels according to another embodiment of the present invention.

FIGS. 6B and 6C illustrate exemplary sets of front screen, back screen and resulting combination screen presentations that can be used to form a suitable gaming wheel presentation, such as that shown in the simulated display of concentric virtual gaming wheels of FIG. 6A. In FIG. 6B, combination 297 is made by presenting the inner wheel 294 on the front screen 218*a* and the outer wheel 296 on the associated back screen 218*c*. The resulting display 226 is then shown as the "MLD RESULT," which resembles the combined wheel 290 of FIG. 6A. It will be readily appreciated that the use of front and back screens for the separate wheels results in a noticeable three-dimensional effect in the finally displayed combined wheel.

In FIG. 6C, alternative combination 298 is made by overlapping a first wheel on front screen 218*a* with a second wheel on back screen 218*c* to arrive at the "MLD RESULT" combination wheel shown on resulting display 226. As will be readily appreciated, the various images of both front and back displays should be coordinated in order to produce any appealing three-dimensional effect for the corresponding wheel based game.

Method of Use

It will be readily appreciated that the method and illustrative flowchart provided herein are merely exemplary, and that the present invention may be practiced in a wide variety of suitable ways. While the provided flowchart may be comprehensive in some respects, it will be readily understood that not every step provided is necessary, that other steps can be included, and that the order of steps might be rearranged as desired by a given manufacturer, as desired.

Figure 7:
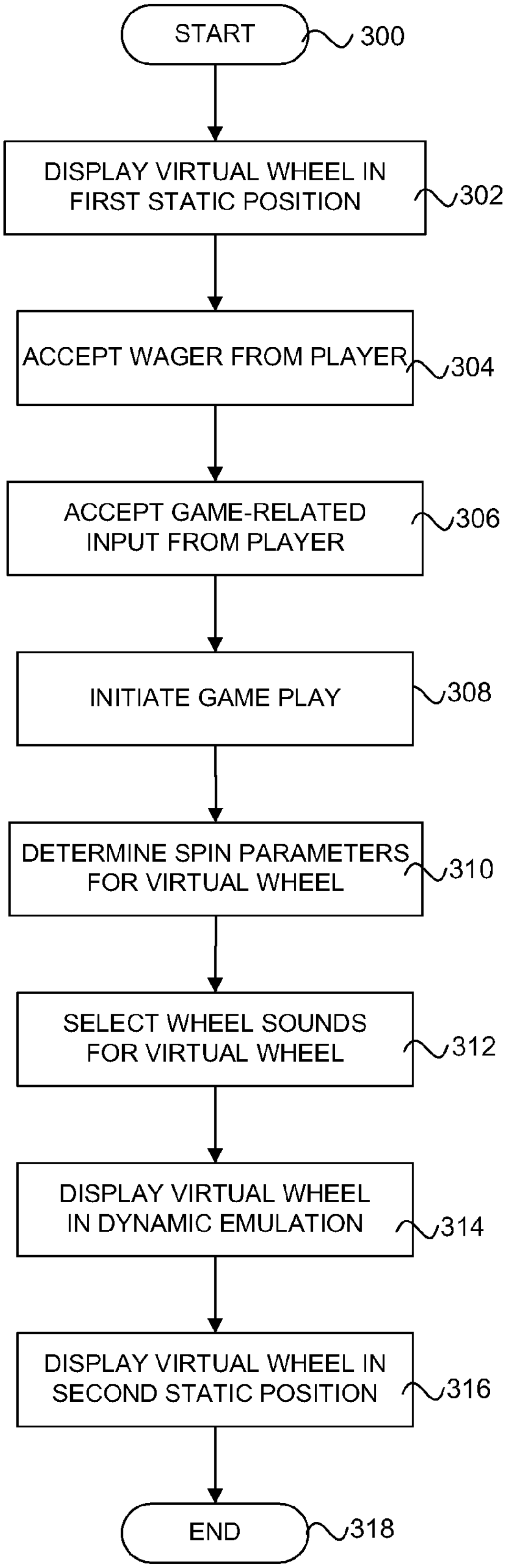
FIG. 7 illustrates a flowchart illustrating an exemplary method of presenting a simulated wheel on a processor-based gaming machine according to one embodiment of the present invention.

Specifically, FIG. 7 illustrates a flowchart illustrating one exemplary method of presenting one or more gaming wheels on a processor-based gaming machine according to one embodiment of the present invention. Such a method serves to illustrate an automated process whereby a specialized wheel spin timer or processor and/or wheel sound generator can be used to provide more realistic wheel presentations. After start step 300, a first process step 302 involves displaying a virtual gaming wheel in a first static position on a display of the gaming machine. Such a gaming wheel can be any of the exemplary gaming wheels as described above, and the display can be, for example, a multi-layer display, as set forth above. Process step 304 then involves accepting a wager from the player, process step 306 involves accepting a game related input from the player, and a game play is then initiated at process step 308.

After game play is initiated at step 308, the various wheel start, spin speed, acceleration, spin time, deceleration and stop parameters are determined for the gaming wheel at process step 310. Such parameters can be determined by an associated specialized wheel processor, as detailed above, and can involve the use of one or more stored values or tables. Various wheel sounds for the gaming wheel can be selected or generated at process step 312. Such wheel sounds can be selected or generated by an associated wheel sound generator, as detailed above, and can involve the random selection of sound clips or snippets from larger sound files.

The method then moves to process step 314, where a dynamic or moving emulation of the gaming wheel is displayed. At process step 316, the gaming wheel is then displayed in a second static position. Such a second static position represents the outcome of the wheel spin from step 314. The method then finishes at end step 318. Of course, additional steps may also apply to such a process, as may be desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A processor-based gaming machine configured to accept a wager, play a game based on the wager and grant a payout based on the result of the wager-based game, comprising:

an exterior housing arranged to contain a plurality of internal gaming machine components therein;

a master gaming controller in communication with at least one of said plurality of internal gaming machine components and configured to execute or control one or more aspects of said wager-based game;

a multi-layer display device in communication with said master gaming controller and configured to display at least one spinning gaming wheel thereupon, said at least one spinning gaming wheel including a plurality of wheel stops distributed thereupon, said spinning gaming wheel configured to depict one or more symbols on a frontal surface of the spinning gaming wheel moving along a circular or elliptical path when viewed by a player of the gaming machine, wherein said multi-layer display device includes:

at least one display controller configured to generate or transmit one or more display signals, a first display screen in communication with said at least one display controller and configured to present a first visual display thereupon based on said one or more display signals, and a second display screen in communication with said at least one display controller and configured to present a second visual display thereupon based upon said one or more display signals, said second display screen being positioned behind said first display screen such that said first and second visual displays are configured to combine for a single visual presentation that includes said at least one spinning gaming wheel to a viewer thereof, wherein said first visual display includes a first portion of said at least one spinning gaming wheel, and wherein said second visual display includes a second portion of said at least one spinning gaming wheel; and a dedicated wheel processor in communication with at least one of said master gaming controller and said multi-layer display device, wherein said dedicated wheel processor is configured to vary display parameters of said at least one spinning gaming wheel from play to play during a session of play of a wheel-type game on said processor-based gaming machine, said display parameters governing the length, speed, acceleration, and deceleration of wheel spins.

2. The processor-based gaming machine of claim 1, further including:

one or more speakers in communication with said master gaming controller and configured to present sounds with respect to said at least one spinning gaming wheel, said sounds including one or more sounds associated with latches, stepper motors, solenoid actuations, brakes, and other mechanical sounds associated with operation of a mechanical wheel.

3. The processor-based gaming machine of claim 2, wherein said one or more speakers comprises a plurality of dedicated wheel speakers located in close proximity to the display of said at least one spinning gaming wheel.

4. The processor-based gaming machine of claim 2, further including:

a wheel sound generator in communication with at least one of said master gaming controller and said one or more speakers, wherein said wheel sound generator is configured to provide sounds to said one or more speakers with respect to said at least one spinning gaming wheel.

5. The processor-based gaming machine of claim 1, further including:

a network interface coupling said gaming machine to one or more remotely located networked components, said network interface configured to facilitate the downloading of wheel spin times, wheel sounds, or both to said gaming machine.

6. The processor-based gaming machine of claim 1, wherein said single visual presentation that includes said at least one spinning gaming wheel includes a graphical representation of said at least one spinning gaming wheel.

7. The processor-based gaming machine of claim 1, wherein said single visual presentation that includes said at least one spinning gaming wheel includes a recorded video clip of an actual physical spinning gaming wheel.

8. The processor-based gaming machine of claim 1, wherein said single visual presentation that includes said at least one spinning gaming wheel includes a live video feed of an actual physical spinning gaming wheel.

9. The processor-based gaming machine of claim 1, wherein said first visual display includes a first portion of said at least one spinning gaming wheel and said second visual display includes a second portion of said at least one spinning gaming wheel, wherein the first portion moves from said first visual display to said second visual display and the second portion moves from said second visual display to said first visual display.

10. A method of presenting a spinning gaming wheel on a processor-based gaming machine, comprising:

displaying on a multi-layer display device of said processor-based gaming machine a gaming wheel in a first static, non-spinning position, wherein said multi-layer display device includes a first display screen configured to present a first visual display thereupon and a second display screen configured to present a second visual display thereupon, said second display screen being positioned behind said first display screen such that said first and second visual displays are configured to combine for a single visual presentation that includes said at least one spinning gaming wheel to a viewer thereof, said gaming wheel configured to depict one or more symbols on a frontal surface of the gaming wheel as moving along a circular or elliptical path when the gaming wheel is in motion and when viewed by a player of the gaming machine, wherein said first visual display includes a first portion of said gaming wheel and wherein said second visual display includes a second portion of said gaming wheel;

accepting a monetary value wager from said player;

accepting a game-related input from said player;

initiating the play of a wager-based game as a result of said game-related input;

determining wheel spin parameters for said gaming wheel, said wheel spin parameters varying from play to play during a session of play of a wheel-type game on said processor-based gaming machine, said wheel spin parameters governing the length, speed, acceleration, and deceleration of wheel spins; and presenting on said multi-layer display said gaming wheel in a spinning motion, wherein said presentation is based at least in part on the determined wheel spin parameters for said gaming wheel.

11. The method of claim 10, further comprising the steps of:

generating wheel sounds for said gaming wheel, said wheel sounds including one or more sounds associated with latches, stepper motors, solenoid actuations, brakes, and other mechanical sounds associated with operation of a mechanical wheel; and presenting said generated wheel sounds on one or more speakers of said processor-based gaming machine.

12. The method of claim 10, further comprising the step of:

displaying on said multi-layer display device said gaming wheel in a second static, non-spinning position after said presenting step.

13. The method of claim 10, further comprising the steps of:

capturing a video clip or feed of an actual physical gaming wheel; and providing said video clip or feed to said multi-layer display device for display thereon.

14. The method of claim 10, further comprising:

moving the first portion from said first visual display to said second visual display; and moving the second portion from said second visual display to said first visual display.

15. A wager-based gaming system, comprising:

a plurality of processor-based gaming machines configured to accept a wager, playing a game based on the wager and granting a payout based on the result of the game, each of said plurality of processor-based gaming machines including:

an exterior housing arranged to contain a plurality of internal gaming machine components therein, a master gaming controller in communication with at least one of said plurality of internal gaming machine components and configured to execute or control one or more aspects of said wager-based reel-type game, and a multi-layer display device in communication with said master gaming controller and configured to present at least one spinning gaming wheel thereupon, said spinning gaming wheel configured to depict one or more symbols on a frontal surface of the spinning gaming wheel moving along a circular or elliptical path when viewed by a player of the gaming machine;

a remote host in communication with said plurality of processor-based gaming machines, said remote host being configured to download one or more wheel parameters to one or more of said plurality of processor-based gaming machines; and at least one dedicated wheel processor in communication with at least one of said remote host and said plurality of processor-based gaming machines, wherein said at least one dedicated wheel processor is configured to vary display parameters of said at least one spinning gaming wheel from play to play during a session of play of a wheel-type game on one or more of said processor-based gaming machines, said display parameters governing the length, speed, acceleration, and deceleration of wheel spins.

16. The wager-based gaming system of claim 15, wherein said at least one dedicated wheel processor is located at said remote host.

17. A wager-based gaming machine, comprising:

an exterior housing arranged to contain a plurality of internal gaming machine components therein;

a master gaming controller in communication with at least one of said plurality of internal gaming machine components and configured to execute or control one or more aspects of a wager-based game;

a display device configured to present a plurality of gaming wheels thereupon, wherein said plurality of gaming wheels are viewed in combination to provide a wager-based game outcome, each of said plurality of gaming wheels configured to depict one or more symbols on a frontal surface of each gaming wheel moving along a circular or elliptical path when viewed by a player of the wager-based gaming machine; and at least one dedicated wheel processor configured to vary display parameters of said plurality of gaming wheels from play to play during a session of play of a wheel-type game on said wager-based gaming machine, said display parameters governing the length, speed, acceleration, and deceleration of wheel spins.

18. The wager-based gaming machine of claim 17, wherein said display device comprises a multi-layer display having a plurality of display screens positioned front to back with respect to each other.

19. The wager-based gaming machine of claim 18, wherein said plurality of gaming wheels are arranged in concentric fashion with respect to each other.

20. The wager-based gaming machine of claim 19, wherein a first gaming wheel is presented on a first display screen of said multi-layer display device, and wherein a second gaming wheel is presented on a second display screen of said multi-layer display device.

21. The wager-based gaming machine of claim 20, wherein said first gaming wheel is concentrically located within said second gaming wheel in a combined visual presentation of said first and second display screens.

22. The wager-based gaming machine of claim 20, wherein said first gaming wheel and said second gaming wheel substantially overlap with each other in a combined visual presentation of said first and second display screens.

23. The wager-based gaming machine of claim 20, wherein said first gaming wheel rotates clockwise and said second gaming wheel rotates counterclockwise during the play of a game on said wager-based gaming machine.

24. The wager-based gaming machine of claim 20, wherein wheel stop positions on said first gaming wheel and said second gaming wheel are configured to align to form a multi-wheel payline across said first and second gaming wheels.

* * * * *